United States Patent
Lecommandoux et al.

(10) Patent No.: US 12,486,359 B2
(45) Date of Patent: Dec. 2, 2025

(54) METHOD FOR PREPARING CONTROLLED PEPTIDE-BASED POLYMERS AND COPOLYMERS IN AN AQUEOUS SOLUTION

(71) Applicants: UNIVERSITÉ DE BORDEAUX, Bordeaux (FR); INSTITUT POLYTECHNIQUE DE BORDEAUX, Talence (FR); Centre national de la recherche scientifique, Paris (FR)

(72) Inventors: Sébastien Lecommandoux, Canejan (FR); Colin Bonduelle, Marcheprime (FR); Elisabeth Garanger, Talence (FR); Chloé Grazon, Bordeaux (FR)

(73) Assignees: UNIVERSITÉ DE BORDEAUX, Bordeaux (FR); INSTITUT POLYTECHNIQUE DE BORDEAUX, Talence (FR); Centre national de la recherche scientifique, Paris (FR)

( * ) Notice: Subject to any disclaimer, the term of this patent is extended or adjusted under 35 U.S.C. 154(b) by 825 days.

(21) Appl. No.: 17/640,020

(22) PCT Filed: Sep. 3, 2020

(86) PCT No.: PCT/EP2020/074533
§ 371 (c)(1),
(2) Date: Mar. 3, 2022

(87) PCT Pub. No.: WO2021/043865
PCT Pub. Date: Mar. 11, 2021

(65) Prior Publication Data
US 2022/0325043 A1    Oct. 13, 2022

(30) Foreign Application Priority Data

Sep. 3, 2019 (FR) .................... 19 09678

(51) Int. Cl.
*C08G 69/10* (2006.01)
*C07K 14/78* (2006.01)
(Continued)

(52) U.S. Cl.
CPC .................... *C08G 69/10* (2013.01)

(58) Field of Classification Search
None
See application file for complete search history.

(56) References Cited

U.S. PATENT DOCUMENTS

| | | |
|---|---|---|
| 2004/0138095 A1 | 7/2004 | Soula et al. |
| 2012/0088848 A1 | 4/2012 | Deming et al. |
| 2012/0135070 A1 | 5/2012 | Kros et al. |

FOREIGN PATENT DOCUMENTS

| | | | |
|---|---|---|---|
| CN | 102391446 A | | 3/2012 |
| CN | 103374128 A | * | 10/2013 |

(Continued)

OTHER PUBLICATIONS

Tsuyuki et al., "The Preparation and Physical Properties of Polypeptidyl Proteins," Journal of American Chemical Society, vol. 7, issue 4, pp. 764-767 (1956). (Year: 1956).*

(Continued)

*Primary Examiner* — Ha S Nguyen
(74) *Attorney, Agent, or Firm* — Troutman Pepper Locke LLP

(57) ABSTRACT

The present invention relates to a "one-pot" method for preparing an aqueous solution of nanoparticles with amphiphilic block copolymers and comprising polypeptide units, the method comprising at least one step (E1), in an aqueous solvent, consisting of bringing together: —at least one hydrophilic polymer (P1) comprising at least one amine function, and —at least one hydrophobic α-amino acid N-carboxyanhydride monomer.

9 Claims, 35 Drawing Sheets

(51) Int. Cl.
C07K 17/08 (2006.01)
C08G 69/40 (2006.01)
C08G 83/00 (2006.01)

(56) References Cited

FOREIGN PATENT DOCUMENTS

CN 104927047 A 9/2015
CN 105968367 A 9/2016
WO 00/68252 A1 11/2000

OTHER PUBLICATIONS

Cai et al., "Synthesis and Self-Assembly Behavior of Amphiphilic Polypeptide-Based Brush-Coil Block Copolymers" Wiley InterScience (www.interscience.wiley.com).(2009) cited in CN Office Action in corresponding Chinese Patent Application No. 202080072425.7, dated May 22, 2024, and submitted herewith.
Chinese Office Action issued in corresponding Chinese Patent Application No. 202080072425.7 dated May 22, 2024, and submitted herewith.
Chinese Office Action issued in corresponding Chinese Patent Application No. 202080072425.7 dated Aug. 26, 2023, with English translation and submitted herewith.
Rapport De Recherche Préliminarie issued in French Patent Application No. 1909678 dated May 14, 2020.
Rapport De Recherche Internationale issued in International Patent Application No. PCT/EP2020/074533 dated Oct. 9, 2020.
Kurita, K., et al., "Studies on Chitin 11. Graft Copolymerization of y-Methyl L-Glutamate NCA onto Water-Soluble Chitin" Polymer Bulletin 14:511-514 (1985) cited in ISR & FR SR.
Jiang, J. et al., "Ring-Opening Polymerization of N-Carboxyanhydride-Induced Self-Assembly for Fabricating Biodegradable Polymer Vesicles" ACS Macro Letters 8(10):1216-1221 (2019) cited in ISR & FR SR.
Jiang, J. et al., "Supporting Information Ring-Opening Polymerization of N-Carboxyanhydride-Induced Self-Assembly for Fabricating Biodegradable Polymer Vesicles" pp. S1-S14 cited in ISR & FR SR.
Warren, N. J., et al. "Polymerization-Induced Self-Assembly of Block Copolymer Nano-objects via RAFT Aqueous Dispersion Polymerization" Journal of the American Cancer Society 136:10174-10185 (2014) cited in ISR & FR SR.
Miyazaki, T., et al. "One-Pot Synthesis of PEG-Poly(amino acid) Block Copolymers Assembling Polymeric Micelles with PEG-Detachable Functionality" American Cancer Society Biomater. Sci. Eng. 5:5727-5733 (2019) cited in ISR.
Sill, K. N., et al. "Synthesis and Characterization of Micelle-Forming PEG=Poly(Amino Acid) Copolymers with Iron-Hyfroxamate Cross-Linkable Blocks for Encapsulation and Release of Hydrophobic Drugs" American Cancer Society Biomacromolecules 18:1874-1884 (2017) cited in FR SR.
Nah, J-W., et al. "Drug-Delivery System Based on Core-Shell-Type Nanoparticles Composed of Poly(y-benzyl-L-glutamate) and Polyethylene oxide)" Journal of Applied Polymer Science 75:1115-1126 (2000) cited in FR SR.
Özcan, I., et al. "Pegylation of poly(y-benzyl-L-glutamate) nanoparticles is efficient for avoiding mononuclear bhagocyte system capture in rats" International Journal of Nanomedicine 5:1103-1111 (2010) cited in FR SR.
Kurita, K., et al. : Studies on Chitin. 13. New Polysaccharide/Polypeptide Hybrid Materials Based on Chitin and Poly (y-methyl L-glutamate) American Chemical Society 1579-1583 (1988) cited in FR SR and ISR as Iwatsuki et al.

* cited by examiner

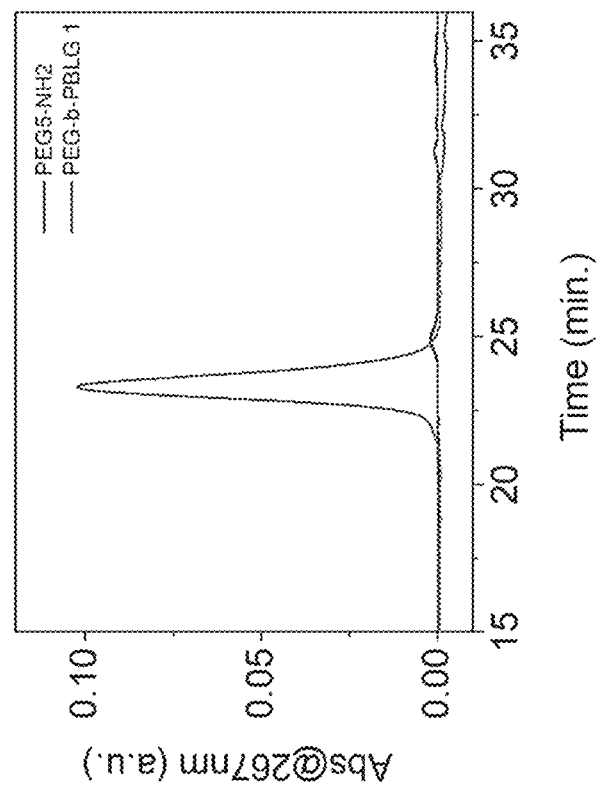
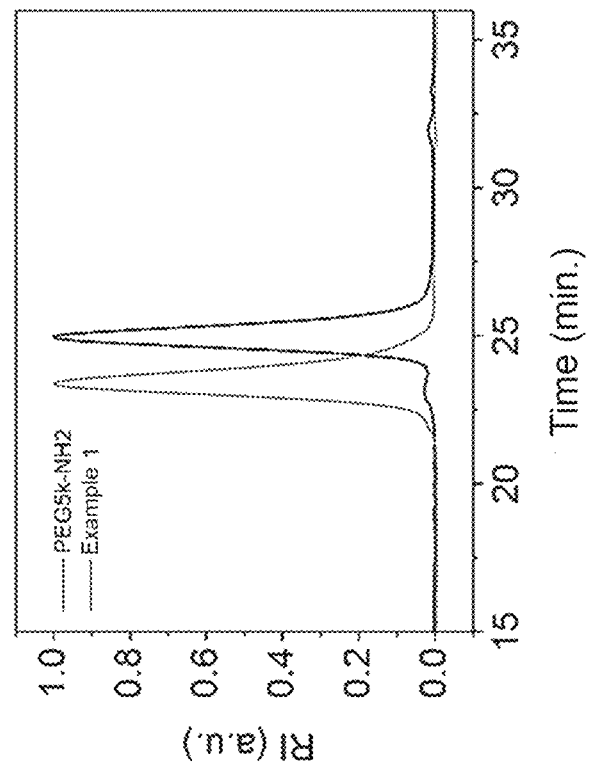
FIG. 1

1% agarose / TAE 1x
80V, 45 min
Sybr Safe detection

METHOD FOR PREPARING CONTROLLED PEPTIDE-BASED POLYMERS AND COPOLYMERS IN AN AQUEOUS SOLUTION

CROSS REFERENCE TO RELATED APPLICATIONS

The present application is a U.S. National Phase application under 35 U.S.C. § 371 of International Patent Application No. PCT/EP2020/074533 filed Sep. 3, 2020, which claims priority of French Patent Application No. 19 09678 filed Sep. 3, 2019. The entire contents of which are hereby incorporated by reference.

FIELD OF THE INVENTION

The subject of the present invention is a method for preparing controlled peptide-based polymers and copolymers in an aqueous solution, and the products such as obtained.

BACKGROUND

The self-assembly of amphiphilic copolymers is a promising strategy for designing advanced nanomaterials having unique properties. Among amphiphilic copolymers, polypeptides form an emerging class of biomaterials used as active vectors in pharmaceutical and cosmetic applications. Up until now, the most economical and most efficient method for preparing nanomaterials based on amphiphilic polypeptides is a method requiring several steps particularly including ring opening polymerization of N-carboxyanhydride monomers (ROP or ROPISA).

This controlled polymerization has recourse to the simplest reagents but still suffers from major limitations, in particular 1) tedious purification steps of the N-carboxyanhydride monomer; 2) significant sensitivity to water and humidity, and 3) implementation in toxic organic solvents such as DMF which must then be removed. The preparation of nanoparticles from amphiphilic polypeptides entails at least one second formulation step, nanoprecipitation, consisting of adding a non-solvent for the hydrophobic segment to a copolymer solution in a solvent common to both blocks. The nanoprecipitation step is generally performed using toxic or volatile organic solvents under relatively dilute conditions (<1 weight %) and is sensitive to problems related to change in scale, which is generally detrimental to regulatory approval of the method.

Polymerization-induced self-assembly (PISA) is a simple and robust approach for accessing amphiphilic polymers with the advantage of simultaneously obtaining nanoparticles of these same polymers. The PISA method implies in situ growth of a living amphiphilic polymer chain which spontaneously self assembles within nanostructures. Up until now, the PISA method has been implemented using radical polymerization processes (RAFT, ATRP, NMP, CMP, TERP) either in dispersion or in emulsion.

SUMMARY

The present invention sets out to provide functionalized nano-objects in a single preparation step.

A further object of the invention is to provide a simple, rapid "one pot" method, in a single step in an aqueous medium, to obtain amphiphilic peptide copolymers without the need for subsequent purification.

A further object of the invention is to provide a polymerization method having very fast polymerization kinetics allowing the obtaining of functional, bioassimilable, biocompatible and biodegradable polymers.

The present invention therefore concerns a "one pot" method for preparing an aqueous solution of nanoparticles of amphiphilic block copolymers and comprising polypeptide units, said method comprising at least one step (E1) in an aqueous solvent free of organic solvent, consisting of bringing together:
- at least one hydrophilic polymer (P1) comprising at least one amine function; and
- at least one hydrophobic α-amino acid N-carboxyanhydride monomer (NCA).

With the method of the invention, it is therefore possible or obtain an aqueous solution of nanoparticles of polypeptide-based amphiphilic block copolymers, and in an aqueous medium.

It is based on a polymerization-induced self-assembly method (called PISA). By adapting the PISA method to NCA monomers, the inventors have fortuitously ascertained that the spontaneous self-assembly of a PISA method provides protection to the latter against hydrolysis.

The present invention therefore concerns the preparation of amphiphilic polypeptides in aqueous solutions via ring opening polymerization.

The method of the invention is a method not requiring the use of an organic solvent. In the invention, the method is performed in the absence of any organic solvent.

In the invention the aqueous solvent does not comprise an organic solvent.

The present invention therefore concerns a method for preparing controlled peptide-based polymers and copolymers in an aqueous solution and the spontaneous self-formulation thereof when implementing this same method, thereby allowing the formation of stable, functional nanoparticles, in a single preparation step, which can be included for example but not limited thereto in the preparation of pharmaceutical or cosmetic preparations.

The method of the invention consists of preparing amphiphilic polypeptide copolymers without organic solvent, that is rapid and controlled and also allows the concomitant formation of nanoparticles, together with dry extract rates higher than 10 weight %, thereby reducing the complexity of already-known methods. In particular, the present invention concerns a method for preparing amphiphilic polypeptide copolymers having faster spontaneous self-formulation, by implementing these two steps concomitantly and without purification, in an aqueous medium.

As mentioned above, the method of the invention comprises the use of at least one hydrophobic NCA monomer.

Any hydrophobic NCA monomer can be used. Depending on the type of NCA monomer used, it can be modified in particular via a hydrophobic protective group to make it hydrophobic.

In one embodiment, the hydrophobic α-amino acid N-carboxyanhydride monomer has following formula (I):

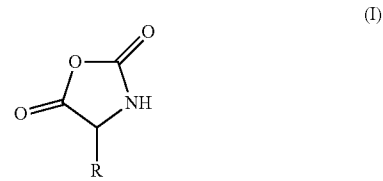

where R is the side chain of an optionally protected, natural or modified, hydrophobic α-amino acid.

When the NCA monomer used is an NCA of a hydrophilic α-amino acid (comprising OH, COOH or NH$_2$ functions in particular), then the above-mentioned R group comprises a hydrophobic protective group to make said monomer hydrophobic.

This protection is not necessary when the NCA used is an NCA of an α-amino acid that is hydrophobic by nature.

As hydrophobic α-amino acid N-carboxyanhydride monomer, the following compounds are particularly used:

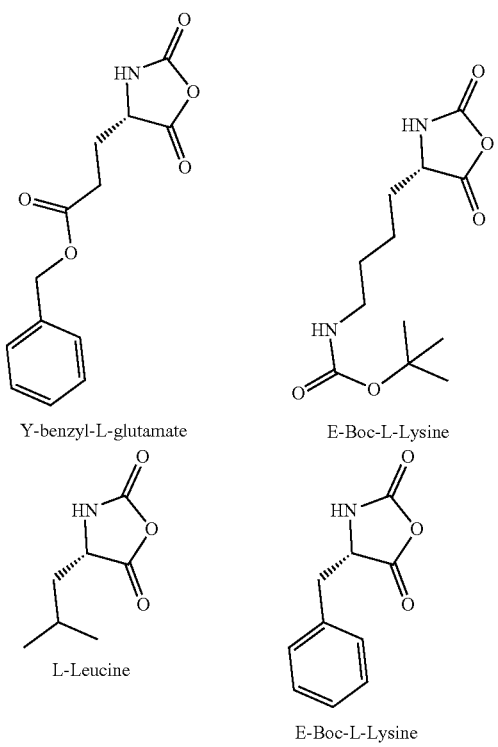

Y-benzyl-L-glutamate

E-Boc-L-Lysine

L-Leucine

E-Boc-L-Lysine

Those preferably cited can be the NCA monomers of y-benzyl-L-glutamate, of ε-Boc-L-Lysine, of L-leucine or of L-Phenylalanine.

As mentioned above, the method of the invention comprises the use of at least one hydrophilic polymer (P1) comprising at least one amine function. This hydrophilic polymer is used as macroinitiator.

In one embodiment, the polymer (P1) is selected from the group consisting of: polyethers, polyesters, poly(meth)acrylates, polysaccharides, polypeptides, polypeptoids, DNA and protein derivatives, in particular elastin-like polypeptides (ELPs) comprising at least one amine function, and it is preferably selected from among poly(ethylene oxide(s)) having at least one amine function.

Preferably, the polymer (P1) is a PEG.

Preferably, the hydrophilic polymer (P1) has a molecular weight higher than 500 g/mol, more preferably a molecular weight of between 2000 g/mol and 10000 g/mol.

Preferably, the polymer (P1) has the following formula:

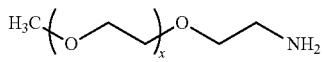

where x is from 16 to 500.

In the method of the invention, the starting product can be compared to a suspension, namely an opaque heterogeneous medium, and the end product obtained is preferably in the form of a homogeneous transparent solution.

With the method of the invention, it is therefore advantageously possible to convert a highly heterogeneous medium, in particular a solid dispersed in water, into a solution of well-defined nanoparticles based on amphiphilic copolymers of controlled macromolecular architecture.

The method of the invention is a "one pot" method i.e. a method in which the reagents undergo one or more successive or simultaneous reactions, but in a single reaction mixture.

In one embodiment, in the method of the invention the aqueous solvent is water or a buffer.

For example, the aqueous solvent is water to which a buffer solution is added.

In one embodiment, the aqueous solvent also comprises a buffer solution comprising a salt at concentrations ranging from 0.01 M to 1 M, selected in particular from the group formed by sodium hydrogen carbonate solutions and phosphate buffer solutions.

Preferably, the method of the invention uses an aqueous solution of NaHCO$_3$.

Preferably, the pH of the aqueous solvent is between 2 and 12, and in particular between 7 and 10.

In one embodiment, the temperature at step (E1) is from −10° C. to 80° C., preferably from 0° C. to 4° C.

In one embodiment, step (E1) is conducted under agitation from a dispersion of the hydrophobic α-amino acid N-carboxyanhydride monomer.

The method of the invention can also be applied to obtain multiblock copolymers.

Therefore, in one embodiment, the aqueous solution of nanoparticles of amphiphilic block copolymers obtained after step (E1) is subsequently contacted with a second hydrophobic α-amino acid N-carboxyanhydride monomer, the same or differing from the one at step (E1), which allows the obtaining of an aqueous solution of modified nanoparticles of modified amphiphilic block copolymers.

Therefore, in this embodiment, it is possible to obtain gradient or statistical multiblock copolymers, when at least one second hydrophobic α-amino acid N-carboxyanhydride monomer is added differing from the one used at step (E1).

The method of the invention can be applied to obtain nanoparticles, preferably core-corona, preferably elongate, preferably rigid, preferably having a size ranging from 2 nm to 1 μm. Therefore, in this embodiment, it is possible to obtain anisotropic nanoparticles having optical properties.

The present invention also concerns nanoparticles of amphiphilic block copolymers and comprising polypeptide units able to be obtained with the method such as defined above.

The present invention therefore also concerns nanoparticles of amphiphilic block copolymers and comprising polypeptide units obtained with the method such as defined above, said nanoparticles having a core-shell structure and particle size of 2 nm to 1 μm.

The present invention therefore also concerns an aqueous composition comprising nanoparticles such as defined above, the weight content of said nanoparticles being at least 2% relative to the weight of said aqueous composition, and preferably between 2% by weight and 15% by weight relative to the weight of said aqueous composition.

This content of solids is measured after polymerization and after purification of the salts via dialysis by performing lyophilization (comparison of residue weight with weight before lyophilization).

BRIEF DESCRIPTION OF THE DRAWINGS

FIG. 1 concerns size exclusion chromatography performed in DMF (+1 mg/mL LiBr) of the $PEG_{5k}$-b-PBLG copolymer in Example 1. Left: RI detection. Right: absorbance detection.

DETAILED DESCRIPTION

EXAMPLES

Example 1: Concomitant Synthesis of an Amphiphilic Peptide Diblock Copolymer poly(ethylene glycol)$_{5k}$-block-poly(y-benzyl-L-glutamate) and of Their Corresponding Nanoparticles The y-Benzyl-L-glutamate N-carboxyanhydride monomer (BLG-NCA) is a commercial chemical reagent distributed by ISOCHEM. PEG$_{5k}$-NH$_2$ (Mp=5516 Da, Ð=1.02) is distributed by RAPP Polymer. The other reagents are distributed by Sigma-Aldrich.

The NCA monomer of y-benzyl-L-glutamate (300 mg, 1.14 mmol) is placed in an inert atmosphere in a Schlenk tube containing a magnetic stir bar. The Schlenk is cooled in an ice bath for at least 10 minutes. In parallel, an aqueous 0.05 M solution of NaHCO$_3$ containing the macroinitiator PEG$_{5k}$-NH$_2$ (8 mL, 300 mg, 0.06 mmol) is prepared and left to cool in an ice bath for at least 10 minutes. While remaining in the ice bath, the aqueous solution is added to the NCA powder under vigorous stirring. This gives a milky dispersion resulting from non-miscibility of the monomer in the aqueous phase. The reaction is left under agitation 1) first in an iced water bath for about 2 hours, 2) then at ambient temperature for 16 h. The milky dispersion changes to an aqueous opalescent colloidal solution which is transferred to a dialysis tube (dialysis membrane of 3.5 kDa) and dialysed against ultrapure water for 2 days. After lyophilization, a white powder is obtained with a yield of 85±3% (FIGS. 1 to 4).

Example 2: Concomitant Synthesis, in the Absence of Salts, of an Amphiphilic Peptide Diblock Copolymer Poly(Ethylene Glycol)$_{5k}$-Block-Poly(y-Benzyl-L-Glutamate) and of their Corresponding Nanoparticles The y-Benzyl-L-glutamate N-carboxyanhydride monomer (BLG-NCA) is a commercial chemical reagent distributed by ISOCHEM. PEG$_{5k}$-NH$_2$ (Mp=5516 Da, Ð=1.02) is distributed by RAPP Polymer. The other reagents are distributed by Sigma-Aldrich.

Figure 2:
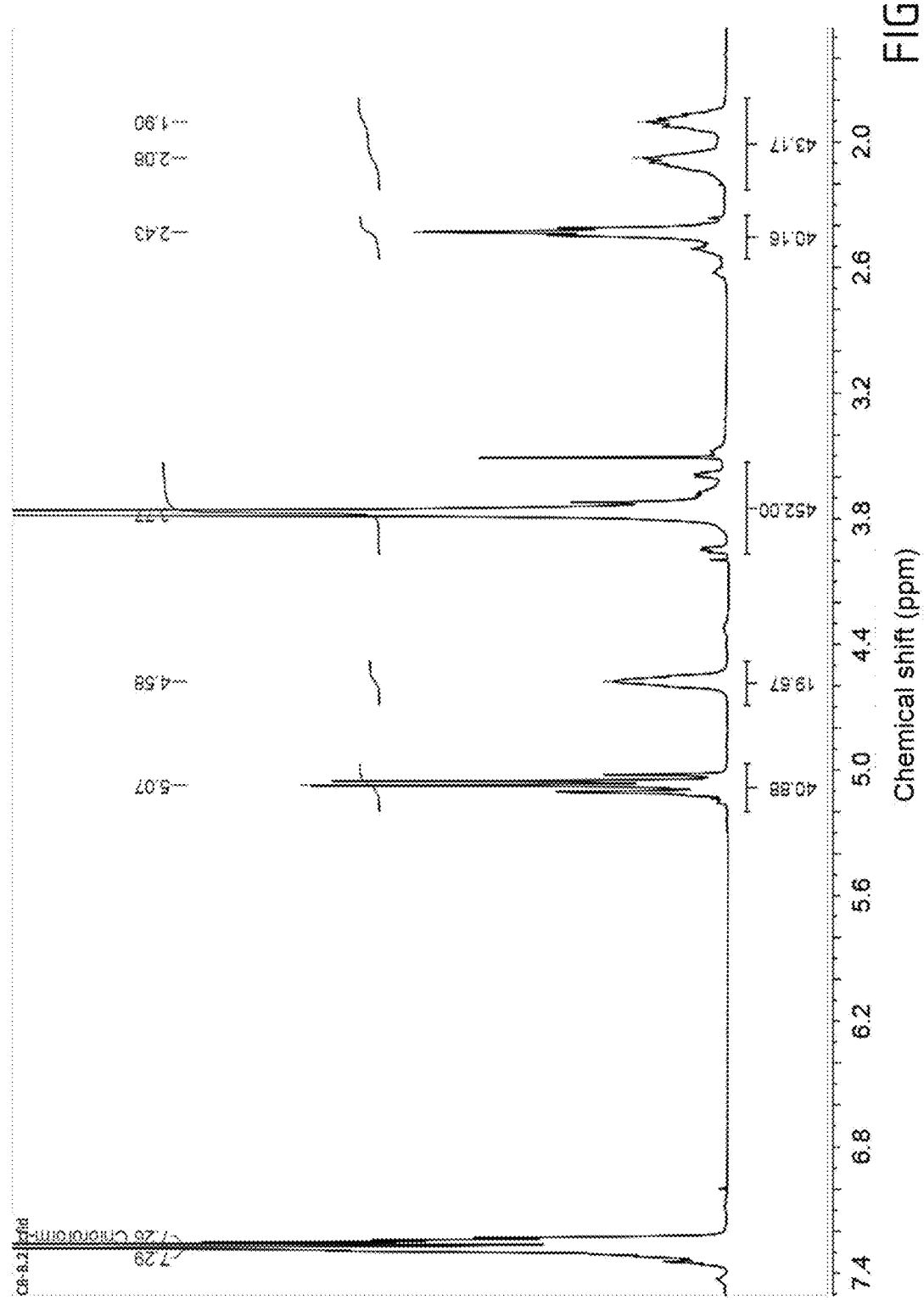
FIG. 2 illustrates the $^1H$ NMR spectrum obtained in $CDCl_3$+15% TFA of the $PEG_{5k}$-b-PBLG copolymer in Example 1.
Figure 3:
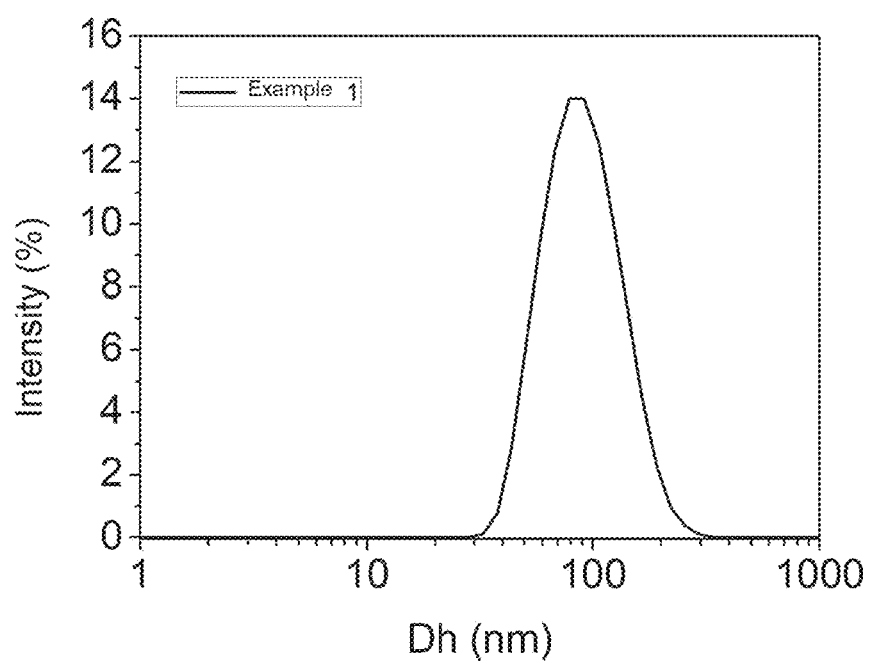
FIG. 3 illustrates the distribution of hydrodynamic diameter (Dh) in diffusion intensity of the nanoparticles of $PEG_{5k}$-b-PBLG in Example 1 (in ultrapure water).
Figure 4:
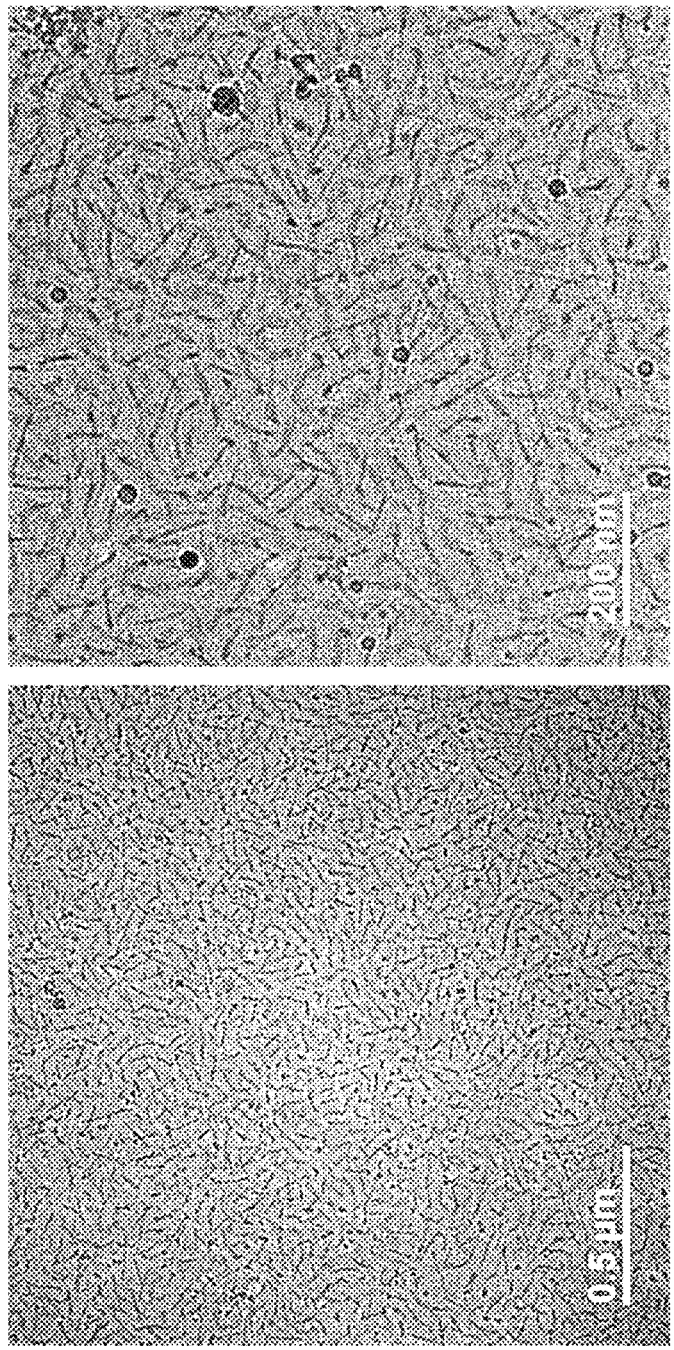
FIG. 4 gives images taken under Transmission Electron Microscopy of cryogenized nanoparticles (Cryo-TEM): nanoparticles of the $PEG_{5k}$-b-PBLG copolymer in Example 1.
Figure 5:
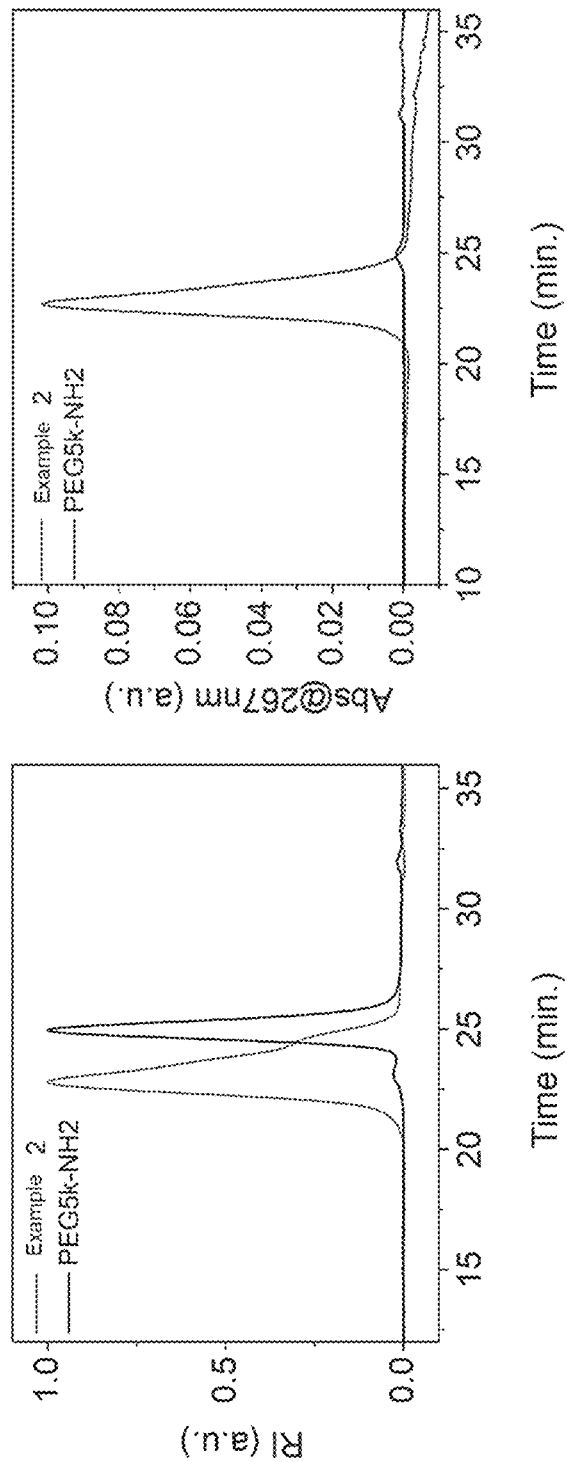
FIG. 5 illustrates size exclusion chromatography performed in DMF (+1 mg/mL LiBr) of the $PEG_{5k}$-b-PBLG copolymer in Example 2. Left: RI detection. Right: absorbance detection.
Figure 6:
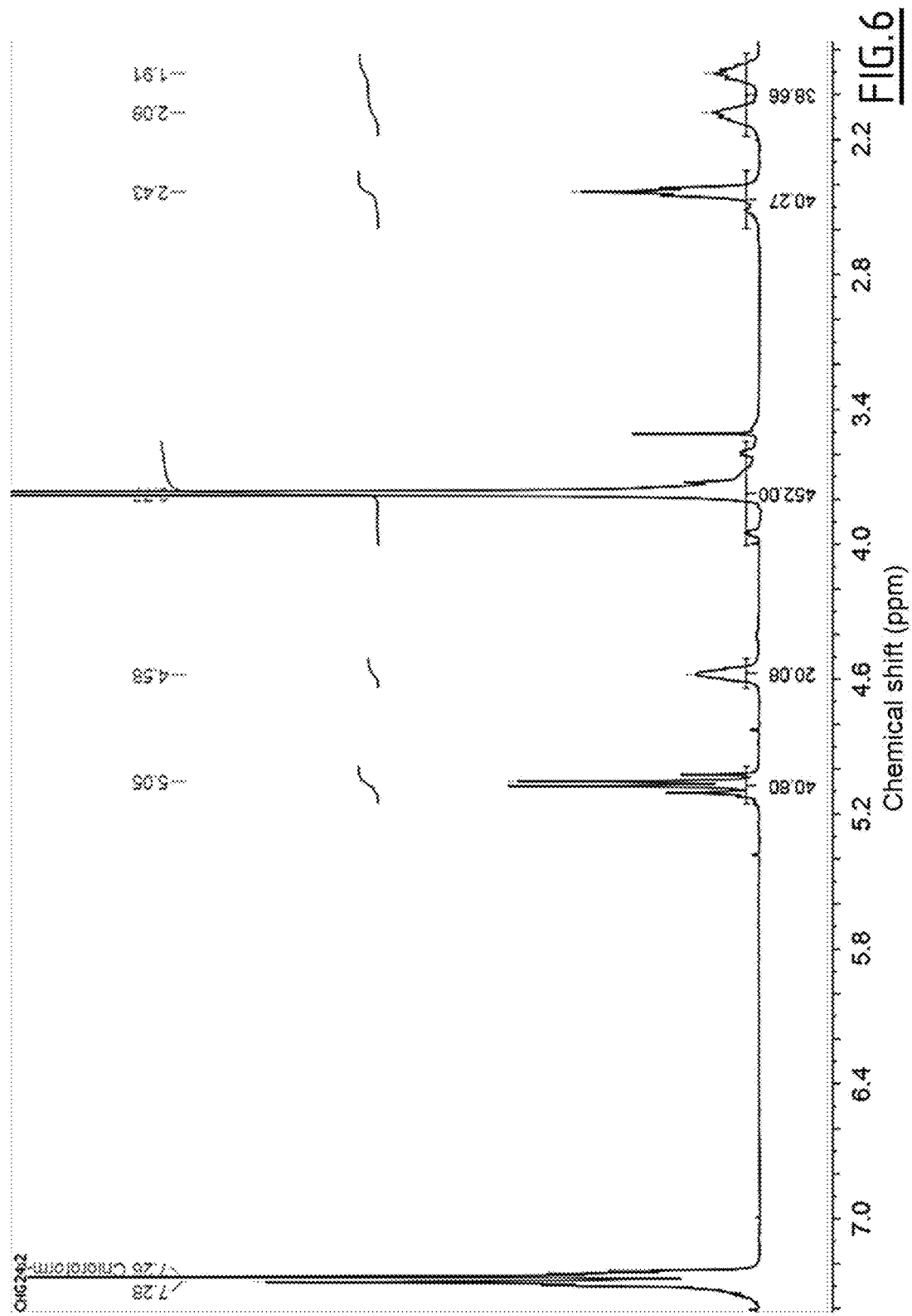
FIG. 6 illustrates the $^1H$ NMR spectrum performed in $CDCl_3$+15% TFA of the $PEG_{5k}$-b-PBLG copolymer in Example 2.
Figure 7:
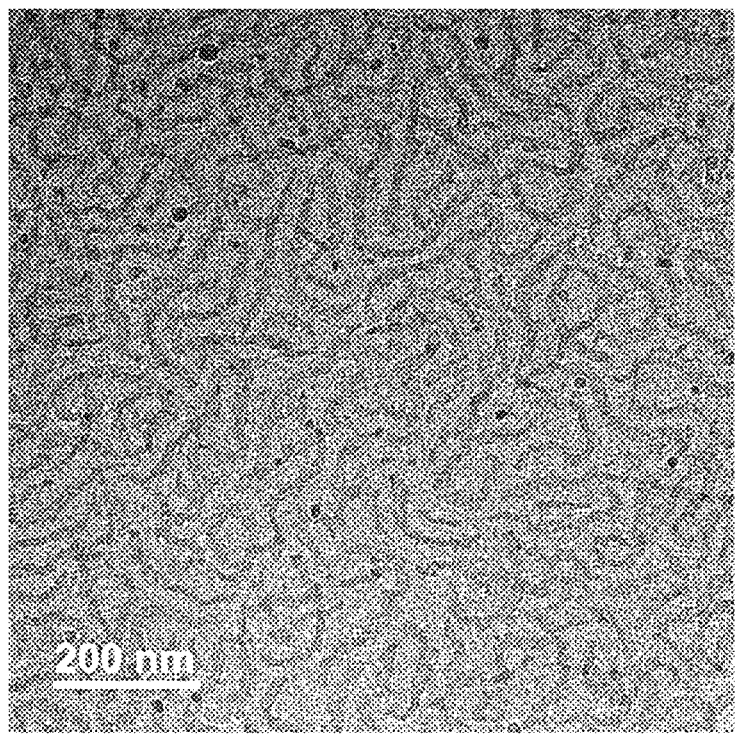
FIG. 7 gives a cryo-TEM image of the nanoparticles of the $PEG_{5K}$-b-PBLG copolymer in Example 2.

The NCA monomer of y-benzyl-L-glutamate (300 mg, 1.14 mmol) is placed in an inert atmosphere in a Schlenk tube containing a magnetic stir bar. The Schlenk is cooled in an ice bath for at least 10 minutes. In parallel, the macroinitiator PEG$_{5k}$-NH$_2$ (8 mL, 300 mg, 0.06 mmol) is diluted in ultrapure water and left to cool in an ice bath for at least 10 minutes. While remaining in the ice bath, the aqueous solution is added to the NCA powder under vigorous stirring. This gives a milky dispersion resulting from non-miscibility of the monomer in the aqueous phase. The reaction is left under agitation 1) first in an iced water bath for about 2 hours, 2) then at ambient temperature for 16 h. The milky dispersion changes to an aqueous opalescent colloidal solution which is transferred to a dialysis tube (dialysis membrane of 3.5 kDa) and dialysed against ultrapure water for 2 days. After lyophilization, a white powder is obtained (FIGS. 5 to 7).

Example 3: Concomitant Synthesis with High Solid Content of an Amphiphilic Peptide Diblock Copolymer poly(ethylene glycol)$_{5k}$-block-poly(y-benzyl-L-glutamate) and of their Corresponding Nanoparticles The y-Benzyl-L-glutamate N-carboxyanhydride monomer (BLG-NCA) is a commercial chemical reagent distributed by ISOCHEM. PEG$_{5k}$-NH$_2$ (Mp=5516 Da, Ð=1.02) is distributed by RAPP Polymer. The other reagents are distributed by Sigma-Aldrich.

Figure 8:
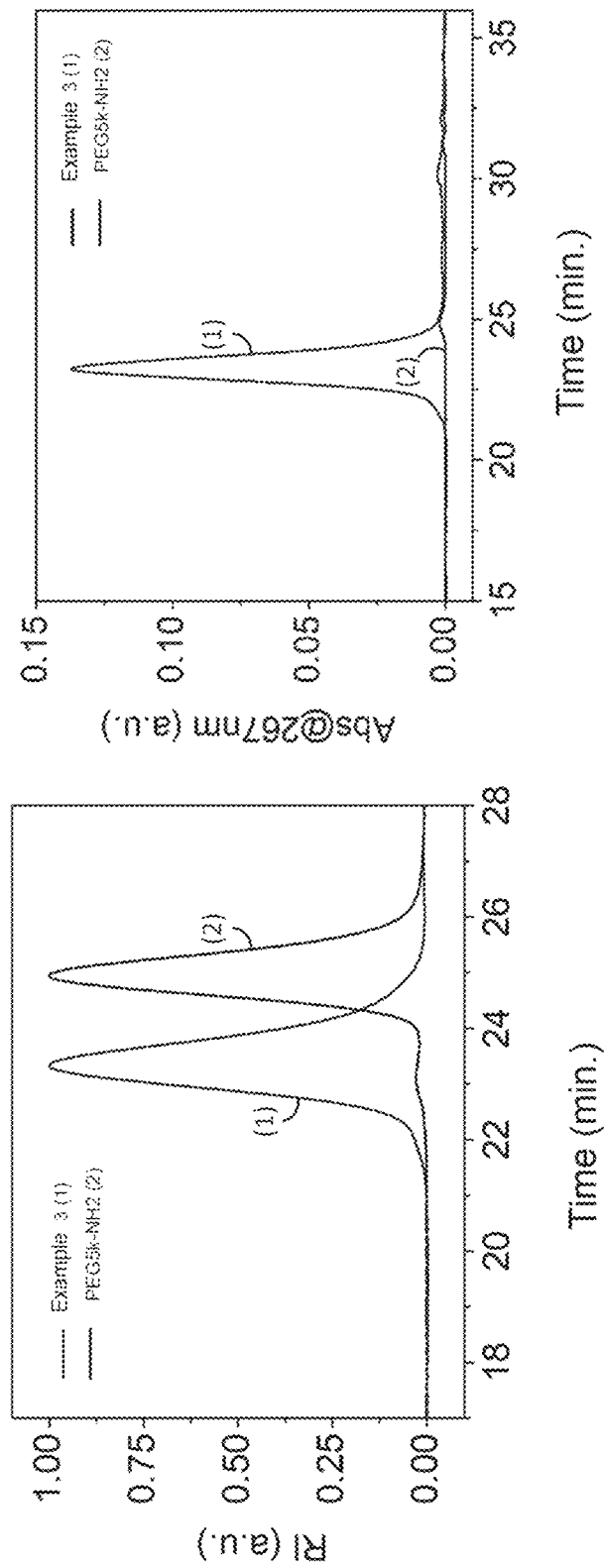
FIG. 8 illustrates size exclusion chromatography performed in DMF (+1 mg/mL LiBr) of the $PEG_{5k}$-b-PBLG copolymer in Example 3. Left: RI detection. Right: absorbance detection.
Figure 9:
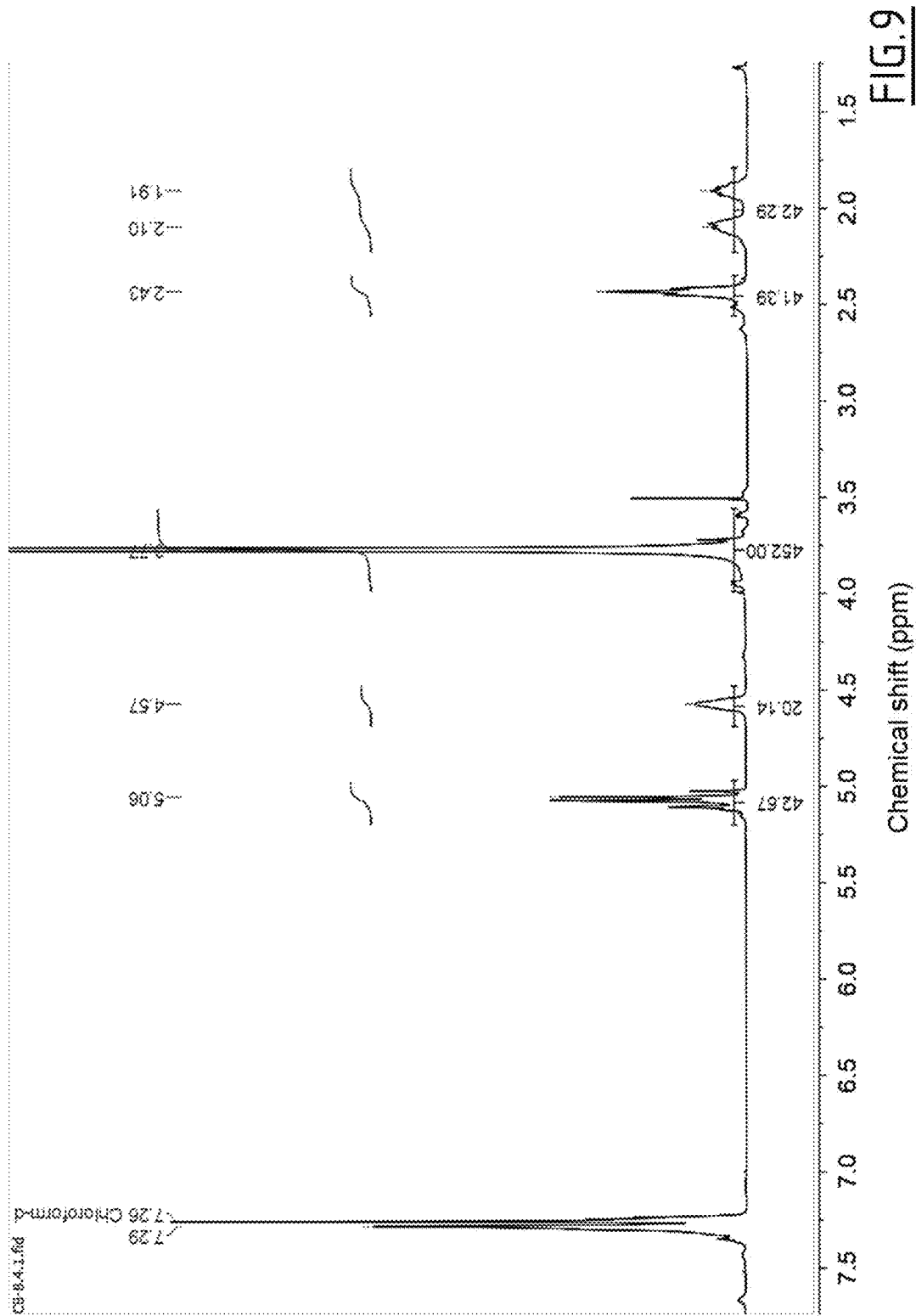
FIG. 9 illustrates the $^1H$ NMR spectrum performed in $CDCl_3$+15% TFA of the $PEG_{5k}$-b-PBLG copolymer in Example 3.
Figure 10:
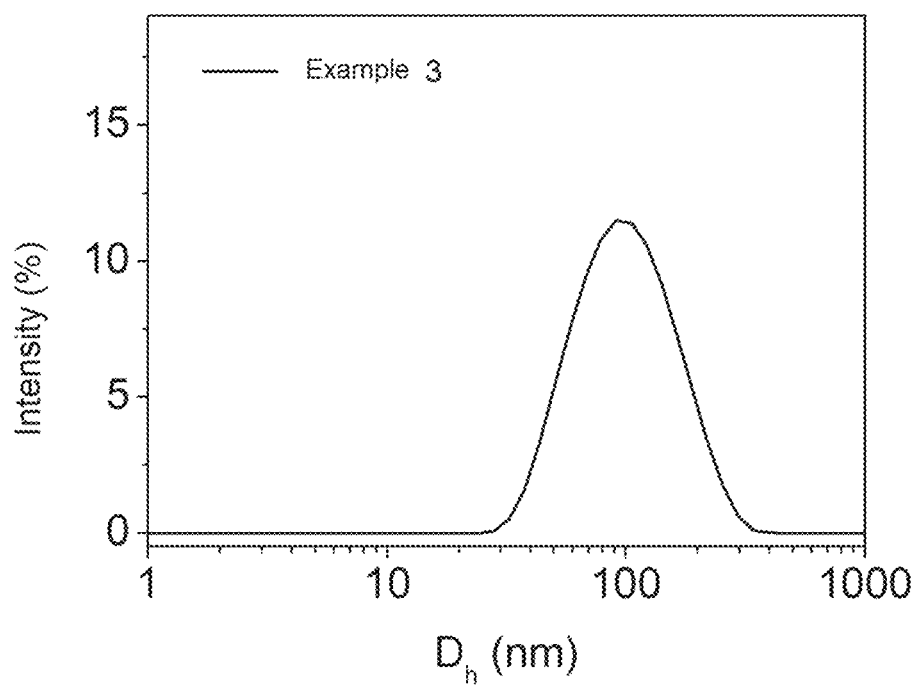
FIG. 10 gives the distribution (in diffusion intensity) of the hydrodynamic diameter (Dh) of the nanoparticles of $PEG_{5k}$-b-PBLG in Example 3 (in ultrapure water).
Figure 11:
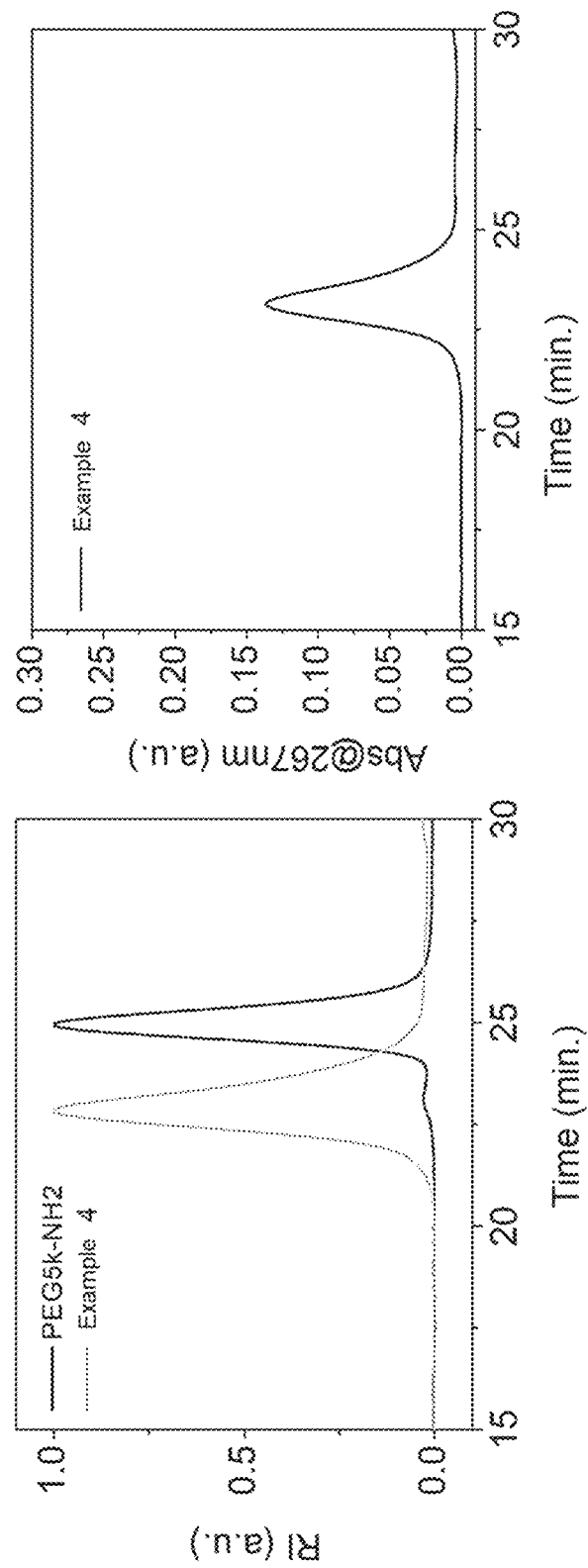
FIG. 11 illustrates size exclusion chromatography performed in DMF (+1 mg/mL LiBr) of the $PEG_{5k}$-b-PBLG copolymer in Example 4. Left: RI detection. Right: absorbance detection.
Figure 12:
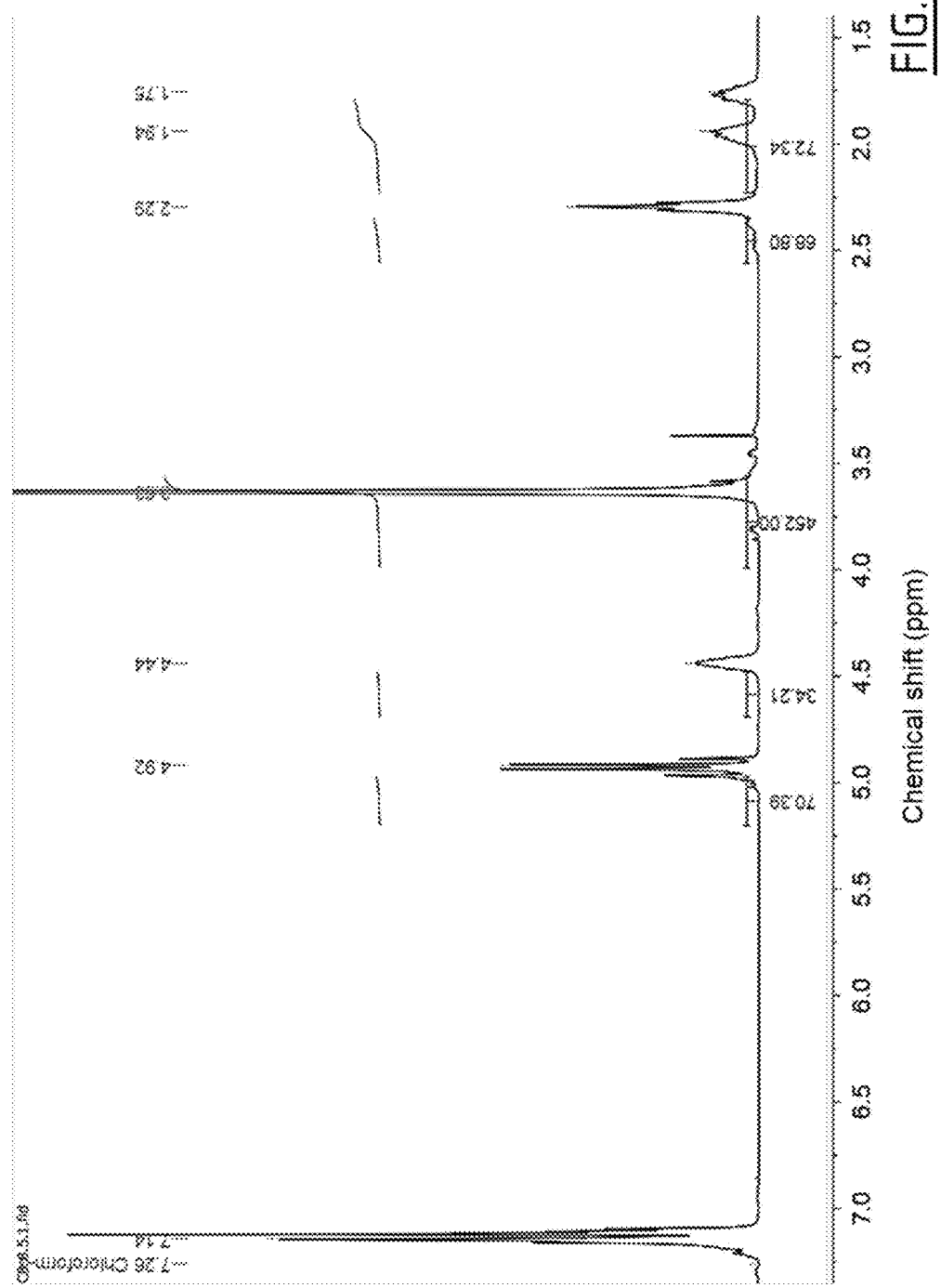
FIG. 12 gives the $^1H$ NMR spectrum performed in $CDCl_3$+15% TFA of the $PEG_{5k}$-b-PBLG copolymer in Example 4.
Figure 13:
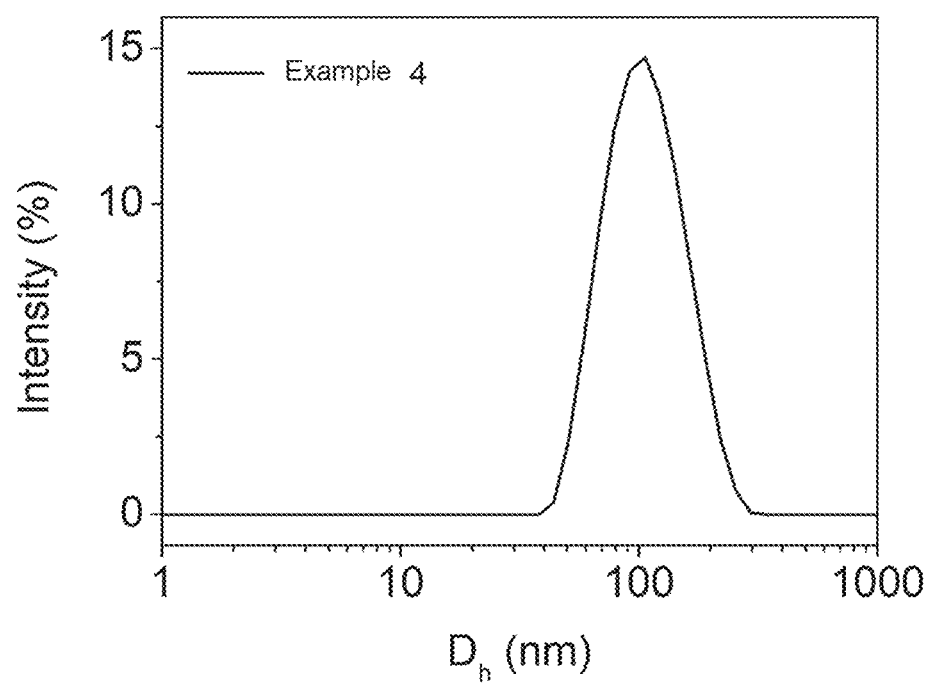
FIG. 13 gives the distribution (in diffusion intensity) of the hydrodynamic diameter (Dh) of the nanoparticles of $PEG_{5k}$-b-PBLG in Example 4 (in ultrapure water).
Figure 14:
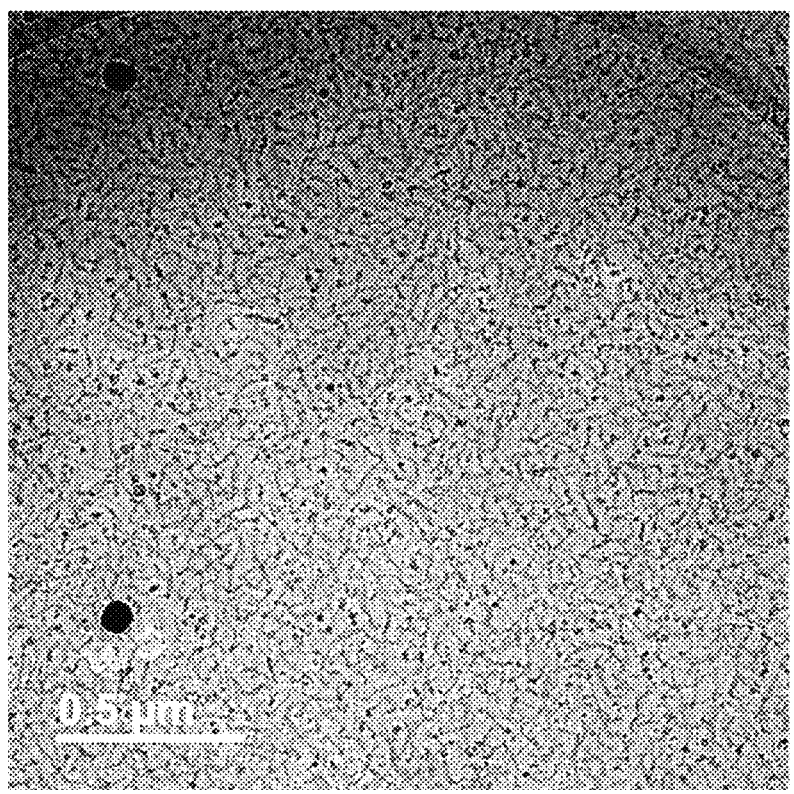
FIG. 14 gives a Cryo-TEM image of the nanoparticles of the $PEG_{5k}$-b-PBLG copolymer in Example 4.

The NCA monomer of y-benzyl-L-glutamate (600 mg, 2.28 mmol) is placed in an inert atmosphere in a Schlenk tube containing a magnetic stir bar. The Schlenk is cooled in an ice bath for at least 10 minutes. In parallel, an aqueous 0.05 M solution of NaHCO$_3$ containing the macroinitiator PEG$_{5k}$-NH$_2$ (8 mL, 600 mg, 0.12 mmol) is prepared and left to cool in an ice bath for at least 10 minutes. While remaining in the ice bath, the aqueous solution is added to the NCA powder under vigorous stirring. This gives a milky dispersion resulting from non-miscibility of the monomer in the aqueous phase. The reaction is left under agitation 1) first in an iced water bath for about 2 hours, 2) then at ambient temperature for 16 h. The milky dispersion changes to an aqueous opalescent colloidal solution which is transferred to a dialysis tube (dialysis membrane of 3.5 kDa) and dialysed against ultrapure water for 2 days. After lyophilization, a white powder is obtained with a yield of 77% (FIGS. 8 to 10).

Example 4: Procedure for Extending the Chain of an Amphiphilic Peptide Diblock Copolymer poly (ethylene glycol)$_{5k}$-block-poly(y-benzyl-L-glutamate)

The y-Benzyl-L-glutamate N-carboxyanhydride monomer (BLG-NCA) is a commercial chemical reagent distributed by ISOCHEM. PEG$_{5k}$-NH$_2$ (Mp=5516 Da, Ð=1.02) is distributed by RAPP Polymer. The other reagents are distributed by Sigma-Aldrich.

The NCA monomer of y-benzyl-L-glutamate (300 mg, 1.14 mmol) is placed in an inert atmosphere in a Schlenk tube containing a magnetic stir bar. The Schlenk is cooled in an ice bath for at least 10 minutes. In parallel, an aqueous 0.05 M solution of NaHCO$_3$ containing the macroinitiator PEG$_{5k}$-NH$_2$ (8 mL, 300 mg, 0.06 mmol) is prepared and left to cool in an ice bath for at least 10 minutes. While remaining in the ice bath, the aqueous solution is added to the NCA powder under vigorous stirring. This gives a milky dispersion resulting from non-miscibility of the monomer in the aqueous phase. After 90 minutes, a second addition of NCA y-benzyl-L-glutamate is made (300 mg, 1.14 mmol). The reaction is left under agitation 1) first in an iced water bath for about 2 hours, 2) then at ambient temperature for 16 h. The milky dispersion changes to an aqueous opalescent colloidal solution which is transferred to a dialysis tube (dialysis membrane of 3.5 kDa) and dialysed against ultrapure water for 2 days. After lyophilization, a white powder is obtained with a yield of 85% (FIGS. 11 to 14).

Example 5: Concomitant Synthesis of an Amphiphilic Peptide Diblock Copolymer poly(ethylene glycol)$_{2k}$-block-poly(y-benzyl-L-glutamate) and of their corresponding nanoparticles The y-Benzyl-L-glutamate N-carboxyanhydride monomer (BLG-NCA) is a commercial chemical reagent distributed by ISOCHEM. PEG$_{2k}$-NH$_2$ (Mp=2022 Da, Ð=1.04) is distributed by RAPP Polymer. The other reagents are distributed by Sigma-Aldrich.

Figure 15:
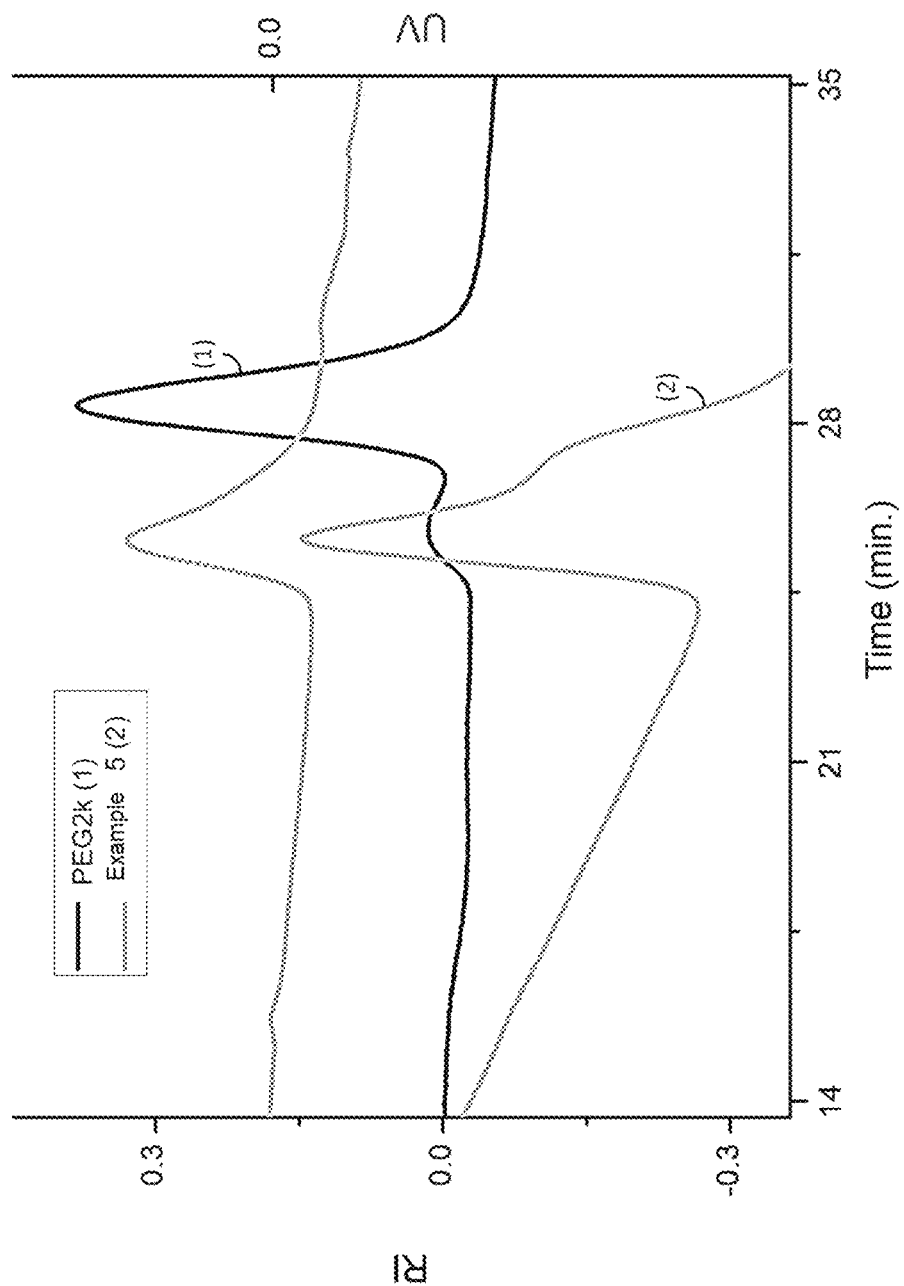
FIG. 15 shows size exclusion chromatography performed in DMF (+1 mg/mL LiBr) of the $PEG_{5k}$-b-PBLG copolymer in Example 5. RI detection in black and grey and absorbance detection in dotted grey line.
Figure 16:
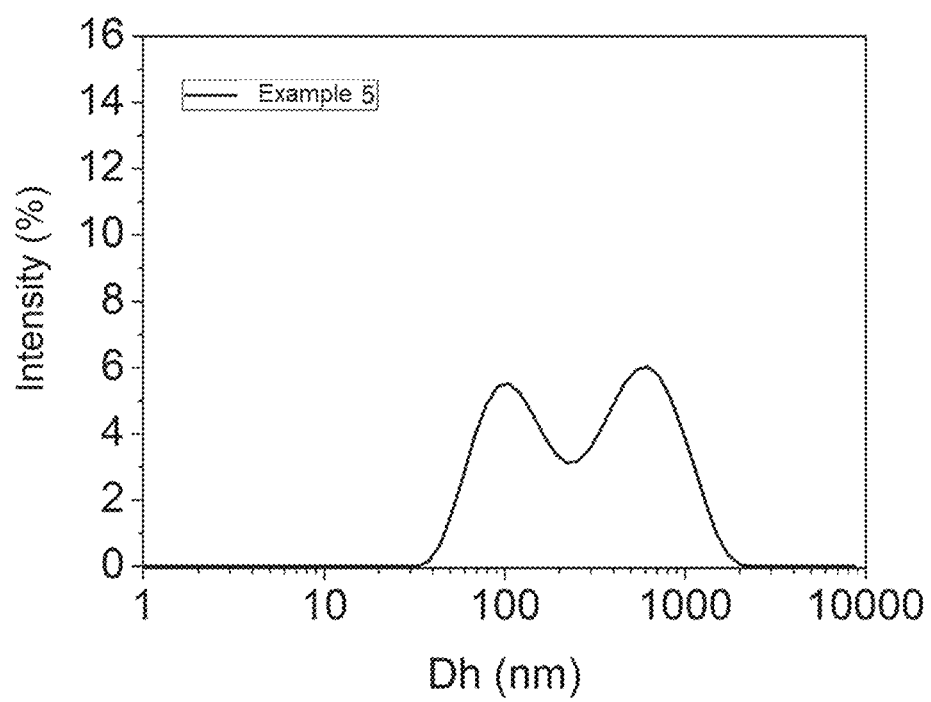
FIG. 16 gives the distribution (in diffusion intensity) of the hydrodynamic diameter (Dh) of the nanoparticles of $PEG_{5k}$-b-PBLG in Example 5 (in ultrapure water).

The NCA monomer of y-benzyl-L-glutamate (30 mg, 0.11 mmol) is placed in an inert atmosphere in a Schlenk tube containing a magnetic stir bar. The Schlenk is cooled in an ice bath for at least 10 minutes. In parallel, an aqueous 0.2 M solution of NaHCO$_3$ containing the macroinitiator PEG$_{2k}$-NH$_2$ (800 µL, 30 mg, 0.015 mmol) is prepared and left to cool in an ice bath for at least 10 minutes. While remaining in the ice bath, the aqueous solution is added to the NCA powder under vigorous stirring. This gives a milky dispersion resulting from non-miscibility of the monomer in the aqueous phase. The reaction is left under agitation 1) first in an iced water bath for about 2 hours, 2) then at ambient temperature for 16 h. The milky dispersion changes to an aqueous colloidal solution which is transferred to a dialysis tube (dialysis membrane of 3.5 kDa) and dialysed against ultrapure water for 2 days. After lyophilization, a white powder is obtained (FIGS. 15 and 16).

Example 6: Concomitant Synthesis of an Amphiphilic Peptide Diblock Copolymer poly(ethylene glycol)$_{10k}$-block-poly(y-benzyl-L-glutamate) and of their Corresponding Nanoparticles The y-Benzyl-L-glutamate N-carboxyanhydride monomer (BLG-NCA) is a commercial chemical reagent distributed by ISOCHEM. PEG$_{10k}$-NH$_2$ (Mp=11153 Da, Đ=1.04) is distributed by RAPP Polymer. The other reagents are distributed by Sigma-Aldrich.

Figure 17:
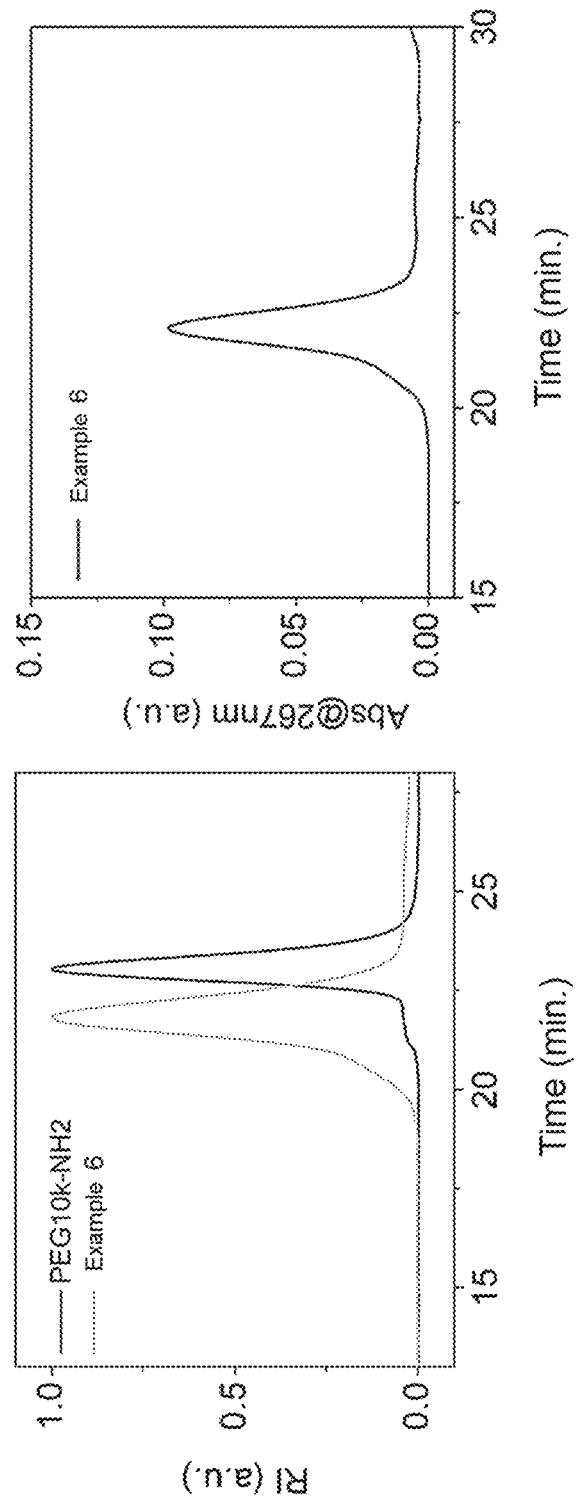
FIG. 17 illustrates size exclusion chromatography performed in DMF (+1 mg/mL LiBr) of the $PEG_{5k}$-b-PBLG copolymer in Example 6. Left: RI detection. Right: absorbance detection.
Figure 18:
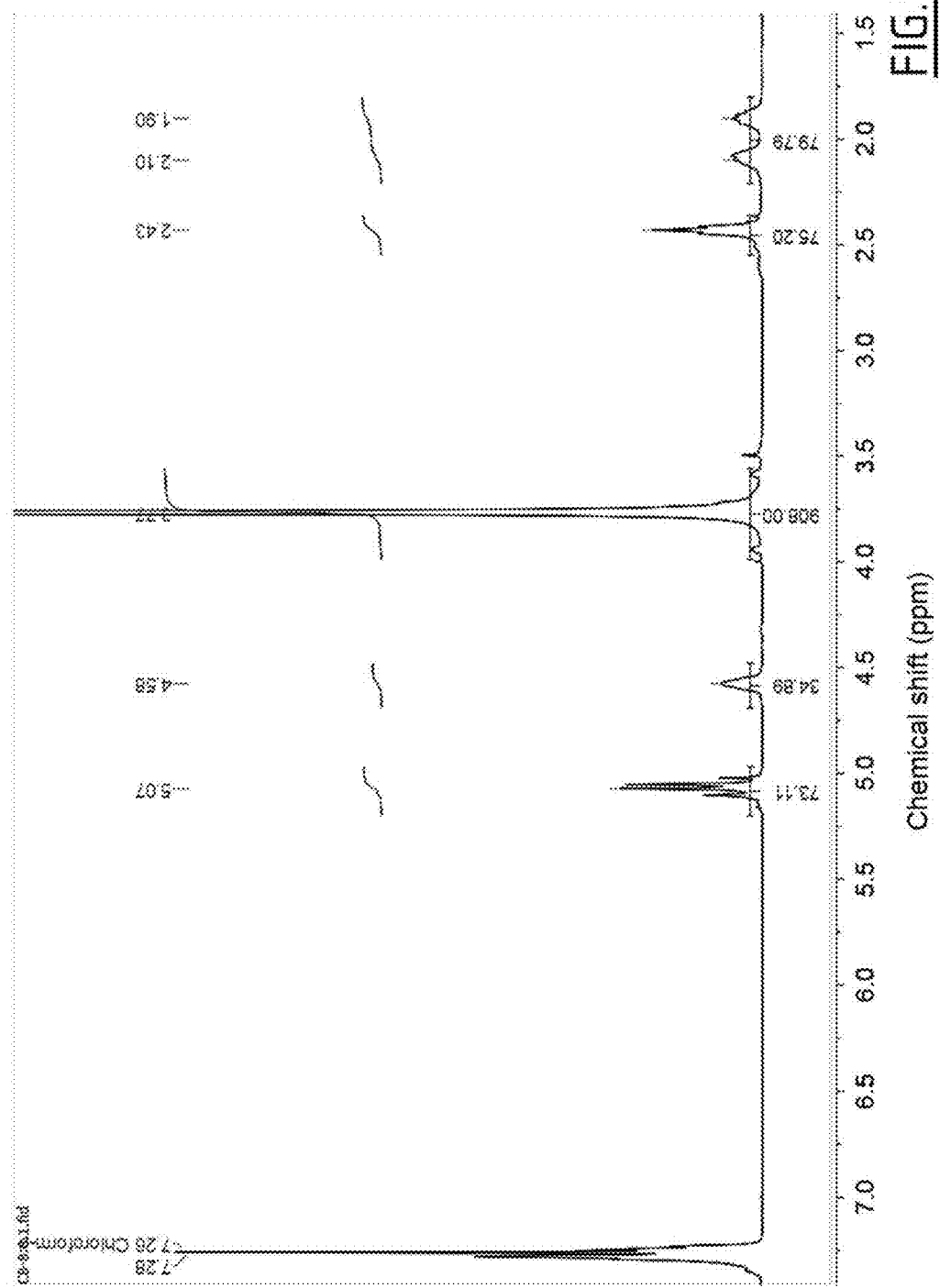
FIG. 18 gives the $^1H$ NMR spectrum performed in $CDCl_3$+15% TFA of the $PEG_{5k}$-b-PBLG copolymer in Example 6.
Figure 19:
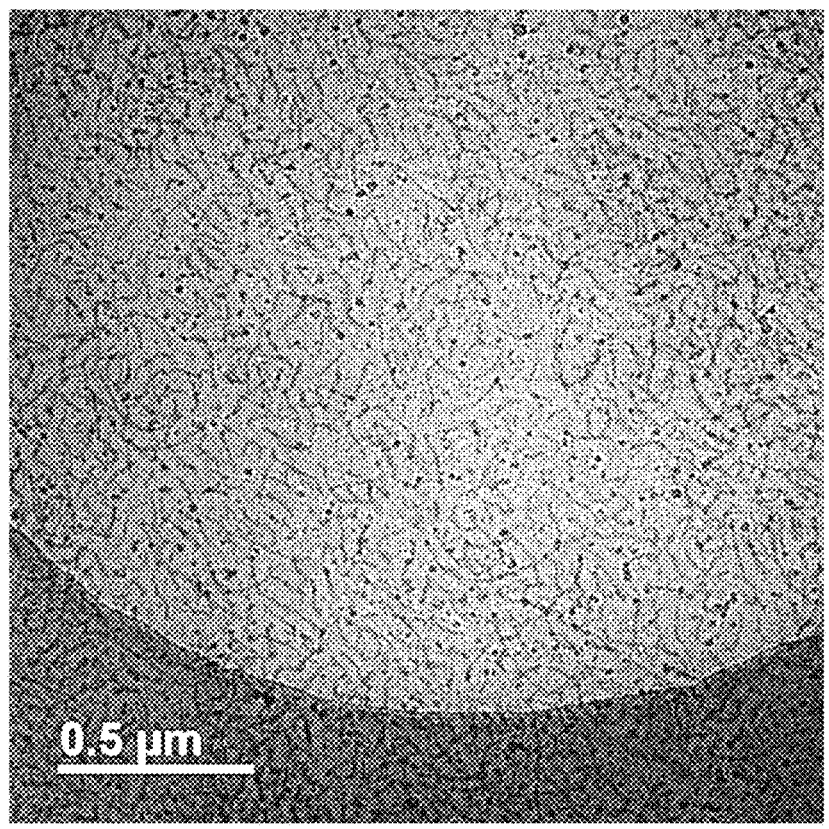
FIG. 19 gives a Cryo-TEM image of the nanoparticles of the $PEG_{5k}$-b-PBLG copolymer in Example 6.

The NCA monomer of y-benzyl-L-glutamate (300 mg, 1.14 mmol) is placed in an inert atmosphere in a Schlenk tube containing a magnetic stir bar. The Schlenk is cooled in an ice bath for at least 10 minutes. In parallel, an aqueous 0.05 M solution of NaHCO$_3$ containing the macroinitiator PEG$_{10k}$-NH$_2$ (8 mL, 300 mg, 0.03 mmol) is prepared and left to cool in an ice bath for at least 10 minutes. While remaining in the ice bath, the aqueous solution is added to the NCA powder under vigorous stirring. This gives a milky dispersion resulting from non-miscibility of the monomer in the aqueous phase. The reaction is left under agitation 1) first in an iced water bath for about 2 hours, 2) then at ambient temperature for 16 h. The milky dispersion changes to a gel which is transferred to a dialysis tube (dialysis membrane of 3.5 kDa) and dialysed against ultrapure water for 2 days. After lyophilization, a white powder is obtained (FIGS. 17 to 19).

Example 7: Concomitant Synthesis of an Amphiphilic Peptide Diblock Copolymer (Elastin-like polypeptide)-block-poly(y-benzyl-L-glutamate) and of their Corresponding Nanoparticles The y-Benzyl-L-glutamate N-carboxyanhydride monomer (BLG-NCA) is a commercial chemical reagent distributed by ISOCHEM. The elastin-like polypeptide (ELP) is a recombinant protein produced in the bacterium *E. coli* at the laboratory: *Laboratoire de Chimie des Polymères Organiques de Bordeaux*, France. The ELP use has a primary amine at its N-terminal end. It has the structure MW (VPGVP VPGMG VPGVG VPGVG)$_{10}$ and a molecular weight of 17 035 Da. The other non-conventional reagents are distributed by Sigma-Aldrich.

Figure 20A:
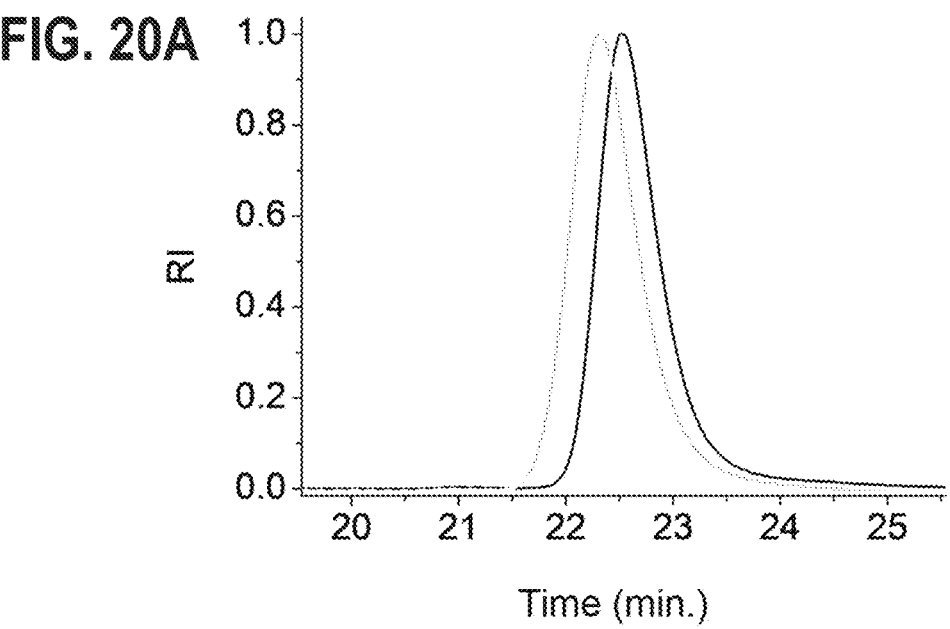
FIG. 20A illustrates size exclusion chromatography performed in DMF (+1 mg/mL LiBr) of the ELPM40-b-PBLG copolymer in Example 7 (RI detection)
Figure 20B:
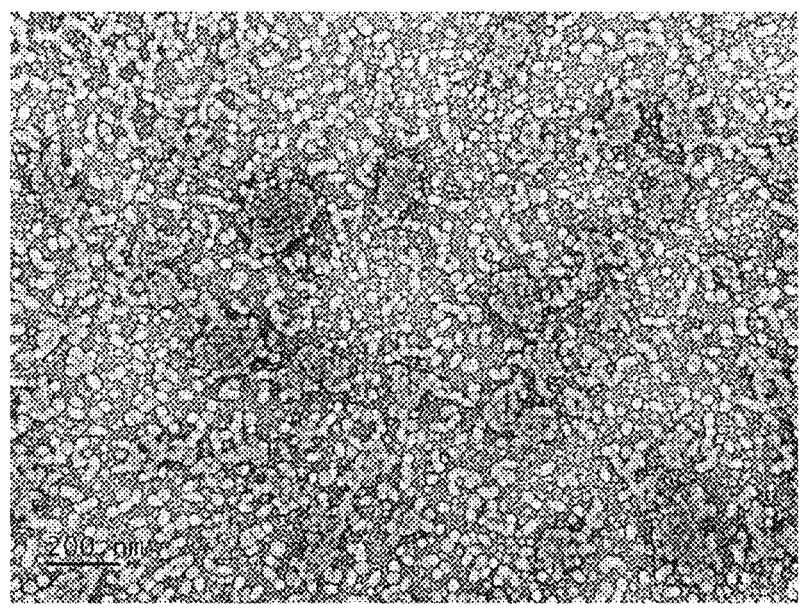
FIG. 20B illustrates a TEM image (uranyl acetate staining) of the nanoparticles of the ELPN40-b-PBLG copolymer in Example 7.
Figure 21:
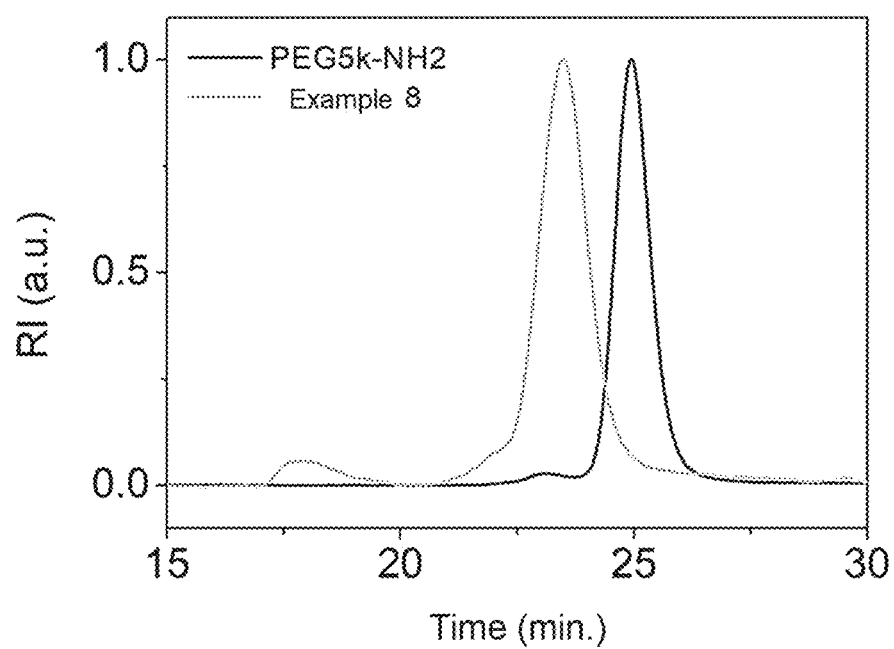
FIG. 21 illustrates size exclusion chromatography performed in DMF (+1 mg/mL LiBr) of the $PEG_{5k}$-b-PLys copolymer in Example 8. RI detection.
Figure 22:
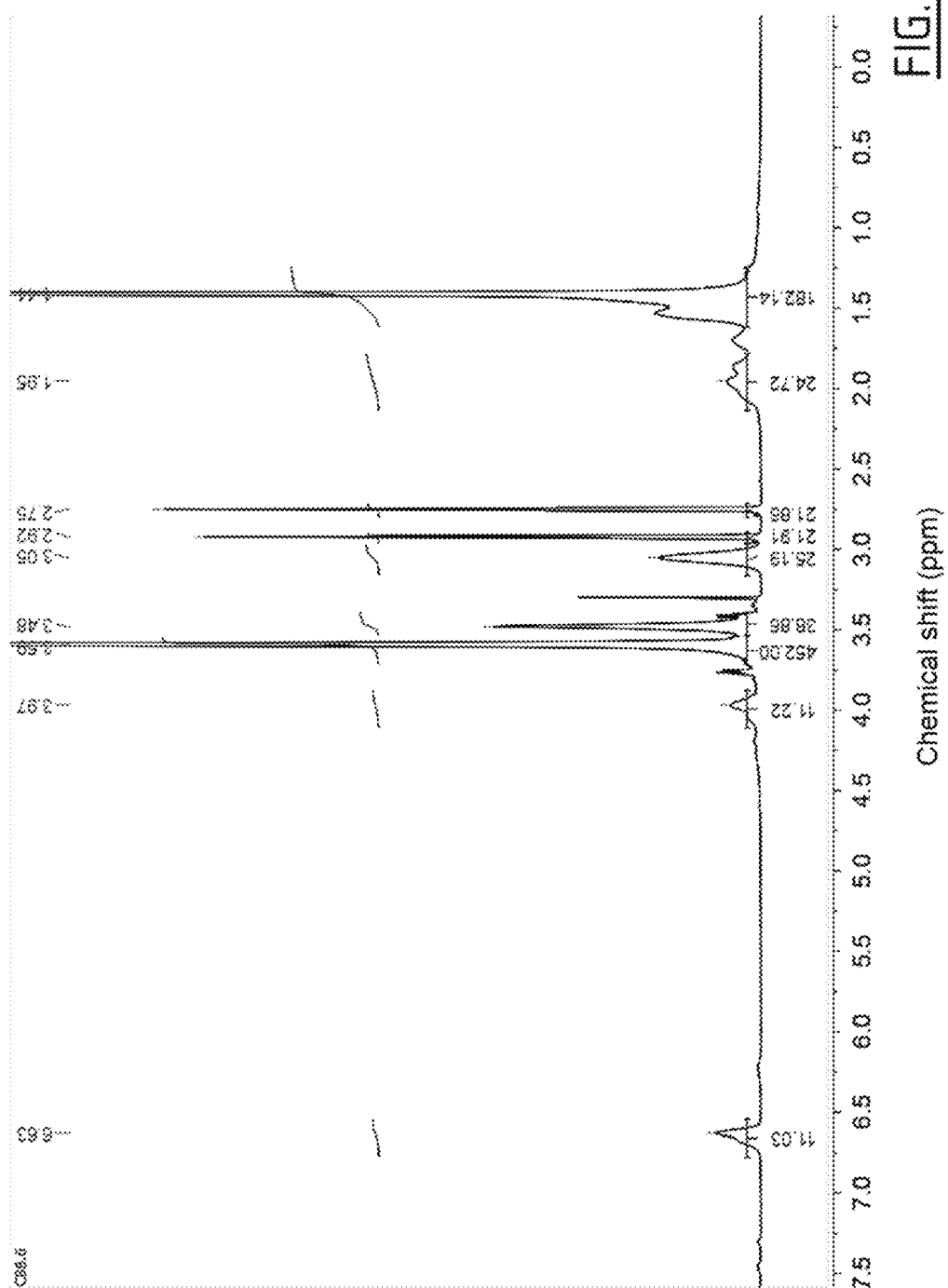
FIG. 22 gives the $^1H$ NMR spectrum performed in DMF-d6 of the $PEG_{5k}$-b-PLys copolymer in Example 8.
Figure 23:
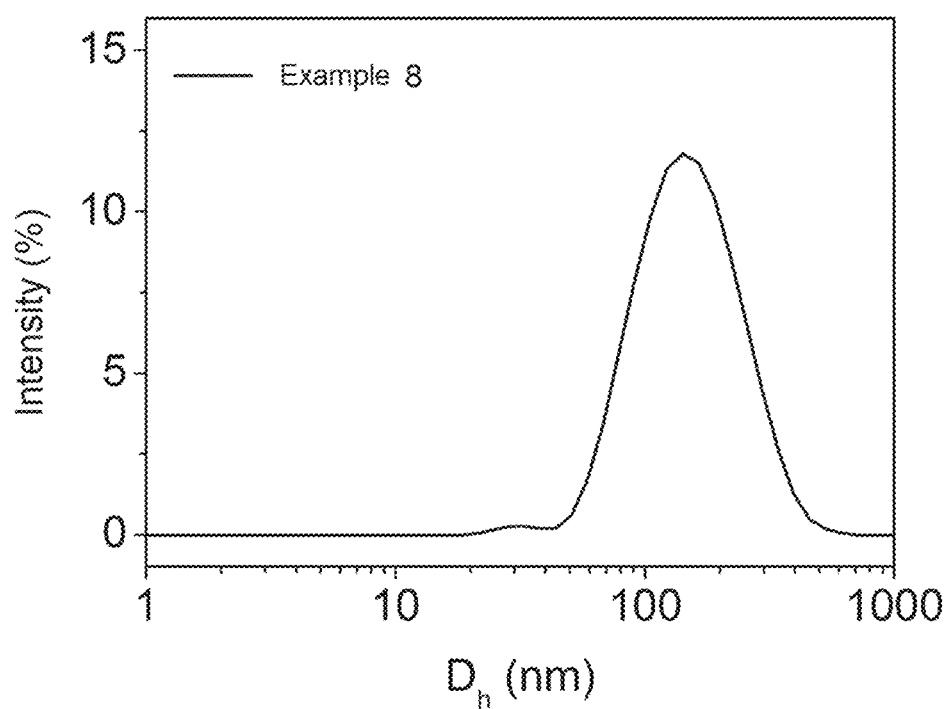
FIG. 23 gives the distribution (in diffusion intensity) of the hydrodynamic diameter (Dh) of the nanoparticles of $PEG_{5k}$-b-PLys in Example 8 (in ultrapure water).
Figure 24:
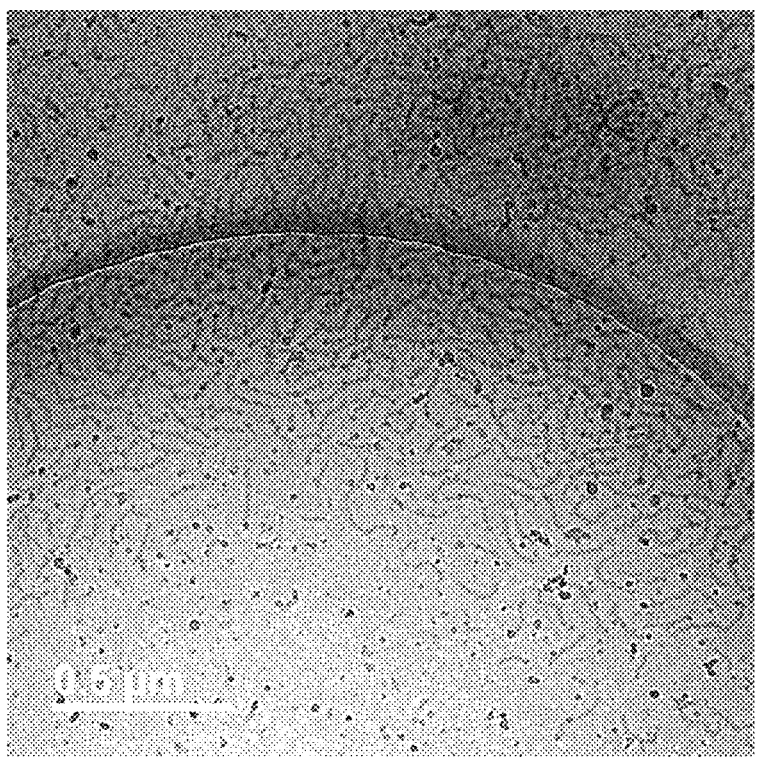
FIG. 24 gives a Cryo-TEM image of the nanoparticles of the $PEG_{5k}$-b-PLys copolymer in Example 8.

The NCA monomer of y-benzyl-L-glutamate (10 mg, 0.04 mmol) is placed in an inert atmosphere in a test tube containing a magnetic stir bar. The tube is cooled in an ice bath for at least 10 minutes. In parallel, an aqueous 0.05 M solution of NaHCO$_3$ containing the ELP macroinitiator (2.7 mL, 10 mg, 0.001 mmol) is prepared and left to cool in an ice bath for at least 10 minutes. While remaining in the ice bath, the aqueous solution is added to the NCA powder under vigorous stirring. This gives a milky dispersion resulting from non-miscibility of the monomer in the aqueous phase. The reaction is left under magnetic agitation at 4° C. for 20 h. The milky dispersion changes to a turbid dispersion at ambient temperature and it is transferred to a dialysis tube (dialysis membrane of 3.5 kDa) and dialysed against ultrapure water for 2 days at 4° C. After lyophilization, a white powder is obtained (FIGS. 20A-20B).

Example 8: Concomitant Synthesis of an Amphiphilic Peptide Diblock Copolymer poly(ethylene glycol)-block-poly(ε-Boc-L-Lysine) and of their Corresponding Nanoparticles The monomer of ε-tert-butyloxycarbonyl-L-lysine N-carboxyanhydride (LysBOC-NCA) is a commercial product distributed by ISOCHEM. PEG$_{5k}$-NH$_2$ (Mp=5516 Da, Đ=1.02) is distributed by RAPP Polymer. The other non-conventional reagents are distributed by Sigma-Aldrich.

The NCA monomer of ε-Boc-L-Lysine (310 mg, 1.14 mmol) is placed in an inert atmosphere in a Schlenk tube containing a magnetic stir bar. The Schlenk is cooled in an ice bath for at least 10 minutes. In parallel, an aqueous 0.05 M solution of NaHCO$_3$ containing the macroinitiator PEG$_{5k}$-NH$_2$ (8 mL, 300 mg, 0.06 mmol) is prepared and left to cool in an ice bath for at least 10 minutes. While remaining in the ice bath, the aqueous solution is added to the NCA powder under vigorous stirring. This gives a milky dispersion resulting from non-miscibility of the monomer in the aqueous phase. The reaction is left under agitation 1) first in an iced water bath for about 2 hours, 2) then at ambient temperature for 16 h. The milky dispersion changes to an aqueous opalescent colloidal solution which is transferred to a dialysis tube (dialysis membrane of 3.5 kDa) and dialysed against ultrapure water for 2 days. After lyophilization, a white powder is obtained with a yield of 79% (FIGS. 21 to 24).

Example 9: Concomitant Synthesis of an Amphiphilic Peptide Triblock Copolymer poly(ethylene glycol)-block-poly(ε-Boc-L-Lysine)-block-poly(y-benzyl-L-glutamate) and of their Corresponding Nanoparticles The y-Benzyl-L-glutamate N-carboxyanhydride (BLG-NCA) and ε-tert-butyloxycarbonyl-L-lysine N-carboxyanhydride monomers (LysBOC-NCA) are commercial products distributed by ISOCHEM. PEG$_{5k}$-NH$_2$ (Mp=5516 Da, Đ=1.02) is distributed by RAPP Polymer. The other non-conventional reagents are distributed by Sigma-Aldrich.

Figure 25:
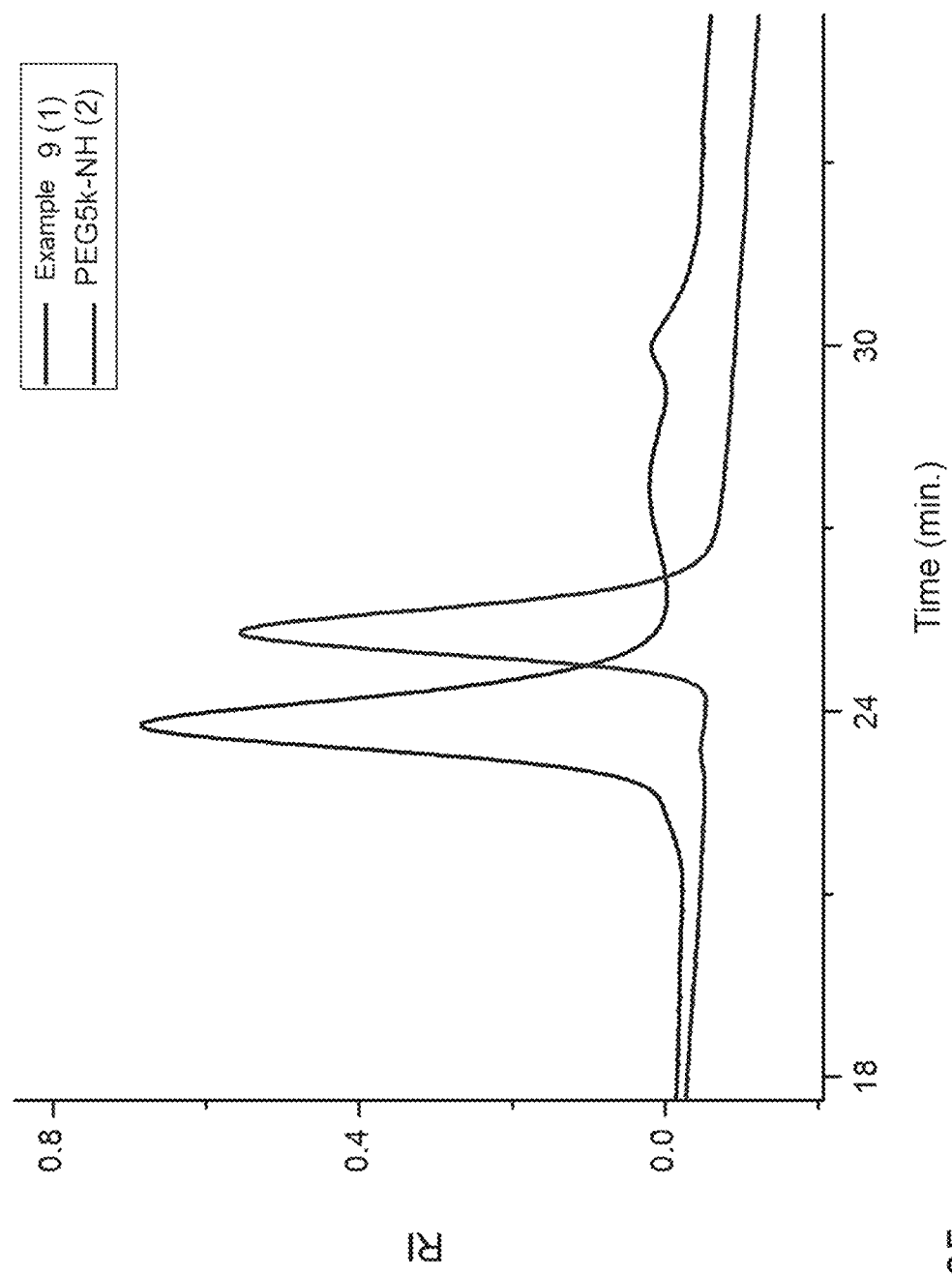
FIG. 25 illustrates size exclusion chromatography in DMF (+1 mg/mL LiBr) of the $PEG_{5k}$-b-PLys-b-PBLG copolymer in Example 9. RI detection.

The NCA monomer of ε-Boc-L-Lysine (300 mg, 1.10 mmol) is placed in an inert atmosphere in a Schlenk tube containing a magnetic stir bar. The Schlenk is cooled in an ice bath for at least 10 minutes. In parallel, an aqueous 0.2 M solution of NaHCO$_3$ containing the PEG$_{5k}$-NH$_2$ macroinitiator (8 mL, 300 mg, 0.06 mmol) is prepared and left to cool in an ice bath for at least 10 minutes. While remaining in the ice bath, the aqueous solution is added to the NCA powder under vigorous stirring. This gives a milky dispersion resulting from non-miscibility of the monomer in the aqueous phase. The reaction is left under agitation in an iced water bath for about 15 minutes. In parallel, the NCA monomer of y-benzyl-L-glutamate (BLG-NCA, 300 mg, 1.14 mmol) is placed in an inert atmosphere in a Schlenk tube containing a magnetic stir bar. The Schlenk is cooled in an ice bath for at least 10 minutes. While remaining in the ice bath, the aqueous opalescent colloidal solution is mixed with the BLG-NCA powder under vigorous stirring. This gives a milky dispersion resulting from non-miscibility of the monomer in the aqueous phase. The reaction is left under agitation 1) first in an iced water bath for about 2 hours, 2) then at ambient temperature for 16 h. The milky dispersion changes to an aqueous opalescent colloidal solution which is transferred to a dialysis tube (dialysis membrane of 3.5 kDa) and dialysed against ultrapure water for 2 days. After lyophilization, a white powder is obtained with a yield of 75±3% (FIG. 25).

Example 10: Concomitant Synthesis of an Amphiphilic Peptide Diblock Copolymer poly(ethylene glycol)5k-block-poly(L-leucine) and of their Corresponding Nanoparticles The L-leucine N-carboxyanhydride monomer (LEU-NCA) is a commercial chemical reagent distributed by ISOCHEM. $PEG_{5k}$-$NH_2$ (Mp=5516 Da, Đ=1.02) is distributed by RAPP Polymer. The other reagents are distributed by Sigma-Aldrich.

Figure 26A:
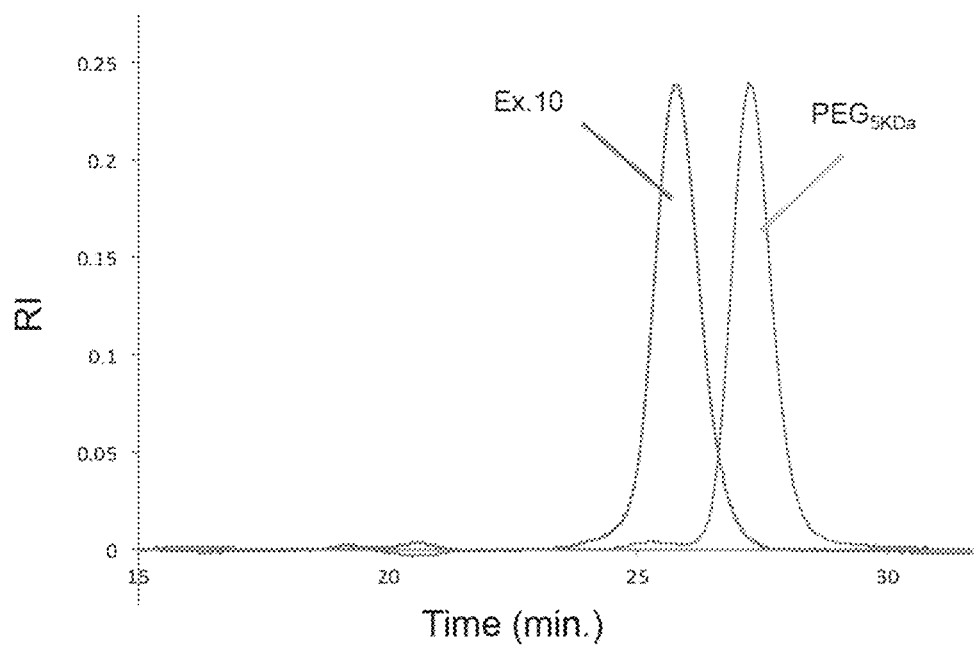
FIG. 26A shows size exclusion chromatography performed in DMF (+1 mg/mL LiBr) of the PLeu-b-PBLG copolymer in Example 10 (RI detection)
Figure 26B:
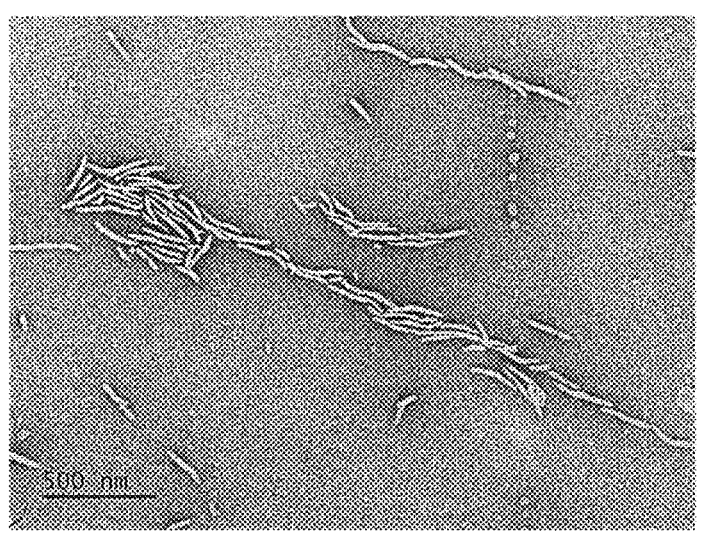
FIG. 26B shows a TEM image (uranyl acetate staining) of the nanoparticles of the PLeu-b-PBLG copolymer in Example 10.

The NCA monomer of leucine (300 mg, 1.9 mmol) is placed in an inert atmosphere in a Schlenk tube containing a magnetic stir bar. The Schlenk is cooled in an ice bath for at least 10 minutes. In parallel, an aqueous 0.05 M solution of $NaHCO_3$ containing the $PEG_{5k}$-$NH_2$ macroinitiator (8 mL, 300 mg, 0.06 mmol) is prepared and left to cool in an ice bath for at least 10 minutes. While remaining in the ice bath, the aqueous solution is added to the NCA powder under vigorous stirring. This gives a milky dispersion resulting from non-miscibility of the monomer in the aqueous phase. The reaction is left under agitation 1) first in an iced water bath for about 2 hours, 2) then at ambient temperature for 16 h. The milky dispersion changes to an aqueous opalescent colloidal solution which is transferred to a dialysis tube (dialysis membrane of 3.5 kDa) and dialysed against ultrapure water for 2 days. After lyophilization, a white powder is obtained with a yield of 77% (FIGS. 26A-26B).

Example 11: Concomitant Synthesis of an Amphiphilic Peptide Diblock Copolymer poly(ethylene glycol)$_{5k}$-block-poly(L-phenylalanine) and of their Corresponding Nanoparticles The L-phenylalanine N-carboxyanhydride monomer (PHE-NCA) is a commercial chemical reagent distributed by ISOCHEM. $PEG_{5k}$-$NH_2$ (Mp=5516 Da, Đ=1.02) is distributed by RAPP Polymer. The other reagents are distributed by Sigma-Aldrich.

Figure 27A:
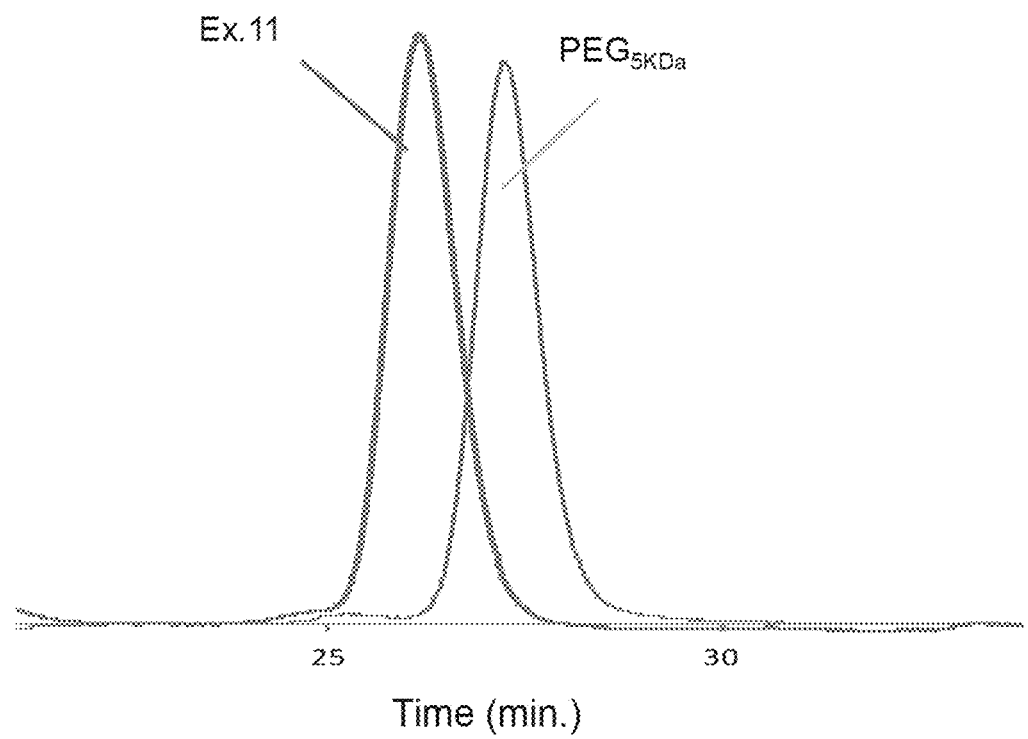
FIG. 27A shows size exclusion chromatography performed in DMF (+1 mg/mL LiBr) of the copolymer PPhe-b-PBLG in Example 11 (RI detection)
Figure 27B:
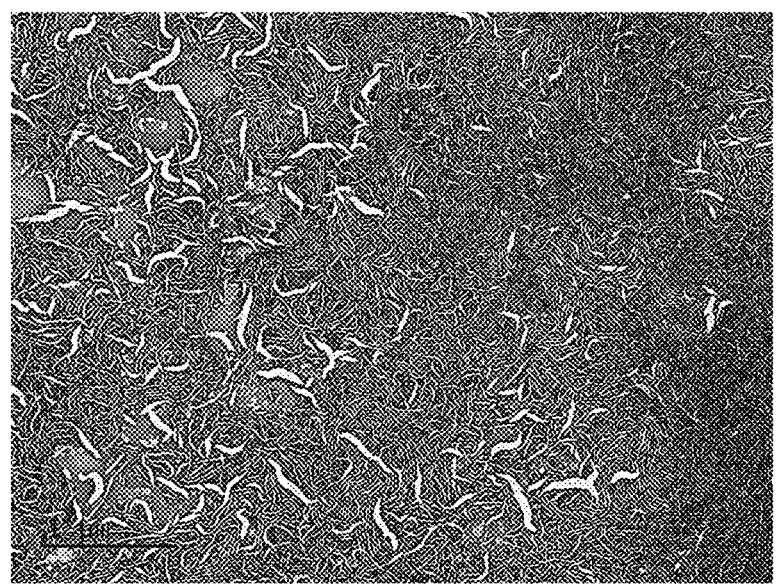
FIG. 27B shows a TEM image (uranyl acetate staining) of the nanoparticles of the PPhe-b-PBLG copolymer in Example 11.

The NCA monomer of phenylalanine (150 mg, 0.8 mmol) is placed in an inert atmosphere in a Schlenk tube containing a magnetic stir bar. The Schlenk is cooled in an ice bath for at least 10 minutes. In parallel, an aqueous 0.05 M solution of $NaHCO_3$ containing the $PEG_{5k}$-$NH_2$ macroinitiator (8 mL, 300 mg, 0.06 mmol) is prepared and left to cool in an ice bath for at least 10 minutes. While remaining in the ice bath, the aqueous solution is added to the NCA powder under vigorous stirring. This gives a milky dispersion resulting from non-miscibility of the monomer in the aqueous phase. The reaction is left under agitation 1) first in an iced water bath for about 2 hours, 2) then at ambient temperature for 16 h. The milky dispersion changes to an aqueous opalescent colloidal solution which is transferred to a dialysis tube (dialysis membrane of 3.5 kDa) and dialysed against ultrapure water for 2 days. After lyophilization, a white powder is obtained with a yield of 72% (FIGS. 27A-27B).

Example 12: Concomitant Synthesis of an Amphiphilic Peptide Triblock Copolymer poly(γ-benzyl-L-glutamate-block-poly(ethylene glycol)$_{5k}$-block-poly(γ-benzyl-L-glutamate) and of their Corresponding Nanoparticles The γ-Benzyl-L-glutamate N-carboxyanhydride monomer (BLG-NCA) is a commercial chemical reagent distributed by ISOCHEM. $NH_2$-$PEG_{5k}$-$NH_2$ (PEG-2arm) is distributed by RAPP Polymer. The other reagents are distributed by Sigma-Aldrich.

Figure 28A:
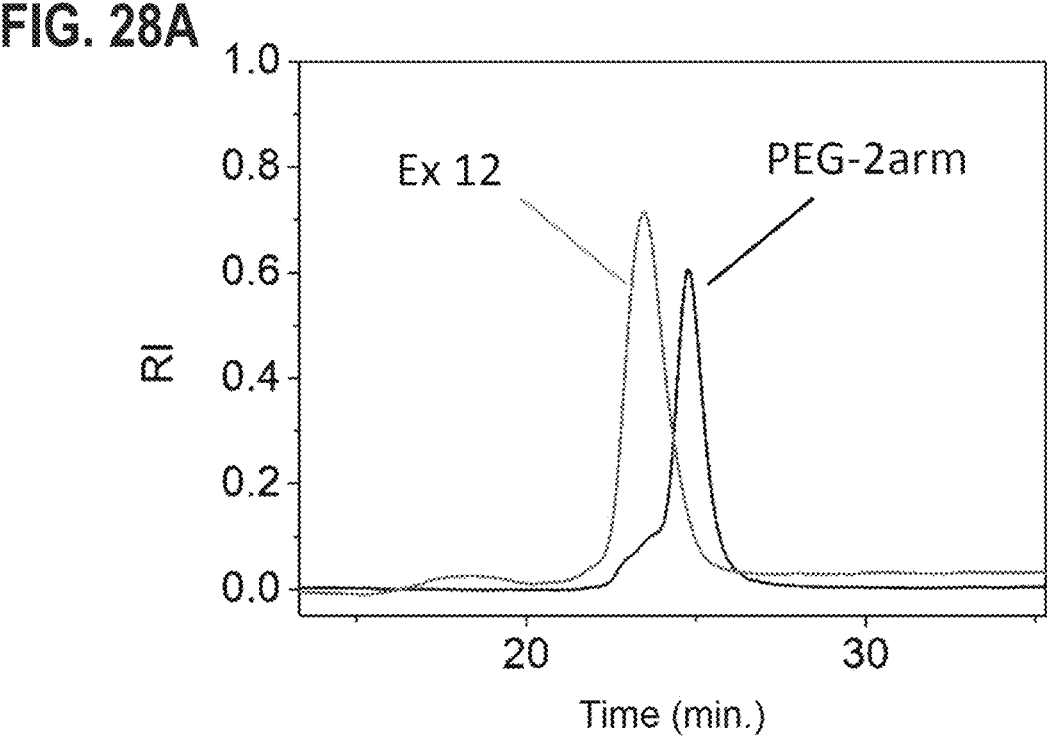
FIG. 28A shows size exclusion chromatography performed in DMF (+1 mg/mL LiBr) of the $PEG_{5k}$-b-PBLG-b-$PEG_{5k}$ copolymer in Example 12 (RI detection)
Figure 28B:
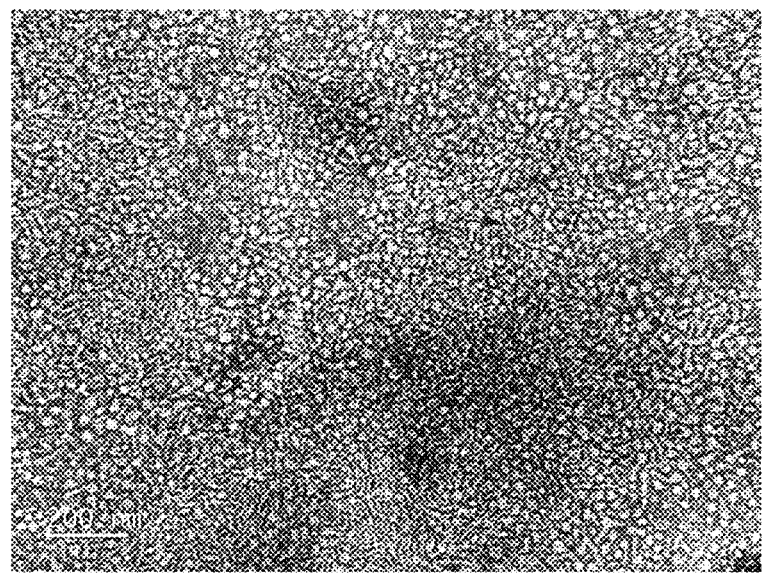
FIG. 28B shows a TEM image (uranyl acetate staining) of the nanoparticles of the $PEG_{5k}$-b-PBLG-b-$PEG_{5k}$ copolymer in Example 12.

The NCA monomer of γ-Benzyl-L-glutamate N-carboxyanhydride (BLG-NCA) (29 mg, 0.11 mmol) is placed in an inert atmosphere in a test tube containing a magnetic stir bar. The tube is cooled in an ice bath for at least 10 minutes. In parallel, an aqueous 0.05 M solution of $NaHCO_3$ containing the $NH_2$-$PEG_{5k}$-$NH_2$ macroinitiator (0.85 mL, 35 mg) is prepared and left to cool in an ice bath for at least 10 minutes. While remaining in the ice bath, the aqueous solution is added to the NCA powder under vigorous stirring. This gives a milky dispersion resulting from non-miscibility of the monomer in the aqueous phase. The reaction is left under agitation 1) first in an iced water bath for about 2 hours, 2) then at ambient temperature for 16 hours. The milky dispersion changes to an aqueous opalescent colloidal solution which is transferred to a dialysis tube (dialysis membrane of 3.5 kDa) and dialysed against ultrapure water for 2 days. After lyophilization, a white powder is obtained (FIGS. 28A-28B).

Example 13: Concomitant Synthesis of an Amphiphilic Peptide Star Copolymer poly(γ-benzyl-L-glutamate)$_4$-block-poly(ethylene glycol)$_{5k}$ and of their Corresponding Nanoparticles The γ-Benzyl-L-glutamate N-carboxyanhydride monomer (BLG-NCA) is a commercial chemical reagent distributed by ISOCHEM. PEG-4arm is distributed by RAPP Polymer (star: 4 $NH_2$ ends). The other reagents are distributed by Sigma-Aldrich.

Figure 29A:
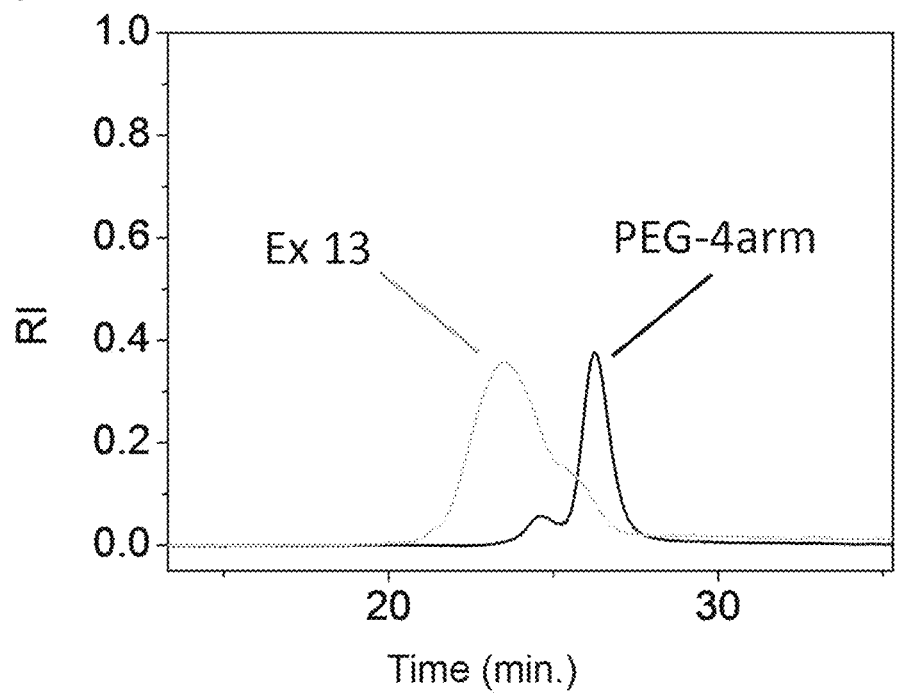
FIG. 29A shows size exclusion chromatography performed in DMF (+1 mg/mL LiBr) of the PEG-4arm-b-$(PBLG)_4$ copolymer in Example 13 (RI detection)
Figure 29B:
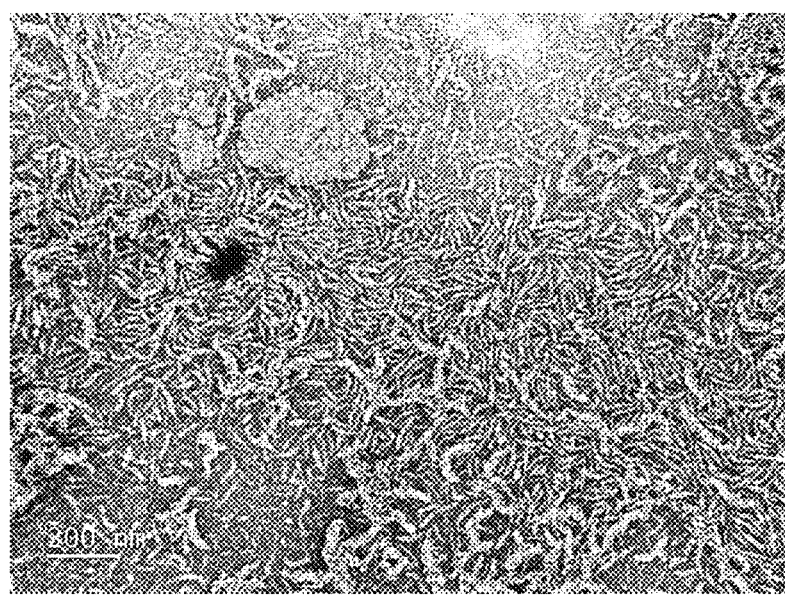
FIG. 29B shows a TEM image (uranyl acetate staining) of the nanoparticles of the PEG-4arm-b-$(PBLG)_4$ copolymer in Example 13.

The NCA monomer of γ-Benzyl-L-glutamate N-carboxyanhydride (BLG-NCA) (18 mg, 0.07 mmol) is placed in an inert atmosphere in a test tube containing a magnetic stir bar. The tube is cooled in an ice bath for at least 10 minutes. In parallel, an aqueous 0.05 M solution of $NaHCO_3$ containing the $PEG_{5k}$-4arm macroinitiator (0.70 mL, 35 mg) is prepared and left to cool in an ice bath for at least 10 minutes. While remaining in the ice bath, the aqueous solution is added to the NCA powder under vigorous stirring. This gives a milky dispersion resulting from non-miscibility of the monomer in the aqueous phase. The reaction is left under agitation 1) first in an iced water bath for about 2 hours, 2) then at ambient temperature for 16 hours. The milky dispersion changes to an aqueous opalescent colloidal solution which is transferred to a dialysis tube (dialysis membrane of 3.5 kDa) and dialysed against ultrapure water for 2 days. After lyophilization, a white powder is obtained (FIGS. 29A-29B).

Example 14: Concomitant Synthesis of an Amphiphilic Peptide Diblock Copolymer poly(sarcosine)-block-poly(γ-benzyl-L-glutamate) and of their Corresponding Nanoparticles The γ-Benzyl-L-glutamate N-carboxyanhydride monomer (BLG-NCA) is a commercial chemical reagent distributed by ISOCHEM. Poly(sarcosine) PSar (Mp=2100 Da, Đ=1.03) is synthesized in the laboratory by conventional ring opening polymerization. The other reagents are distributed by Sigma-Aldrich.

Figure 30A:
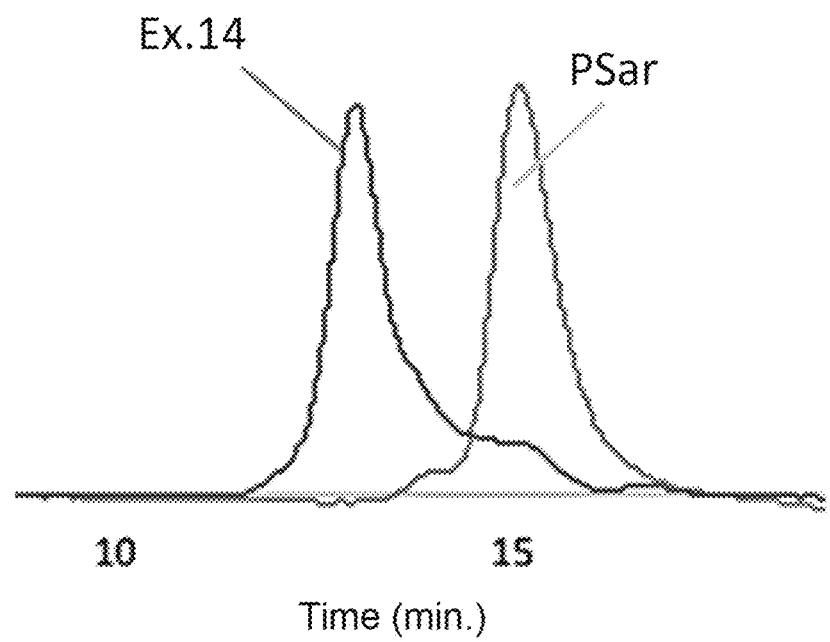
FIG. 30A shows size exclusion chromatography performed in DMF (+1 mg/mL LiBr) of the PSar-b-PBLG copolymer in Example 14 (RI detection)
Figure 30B:
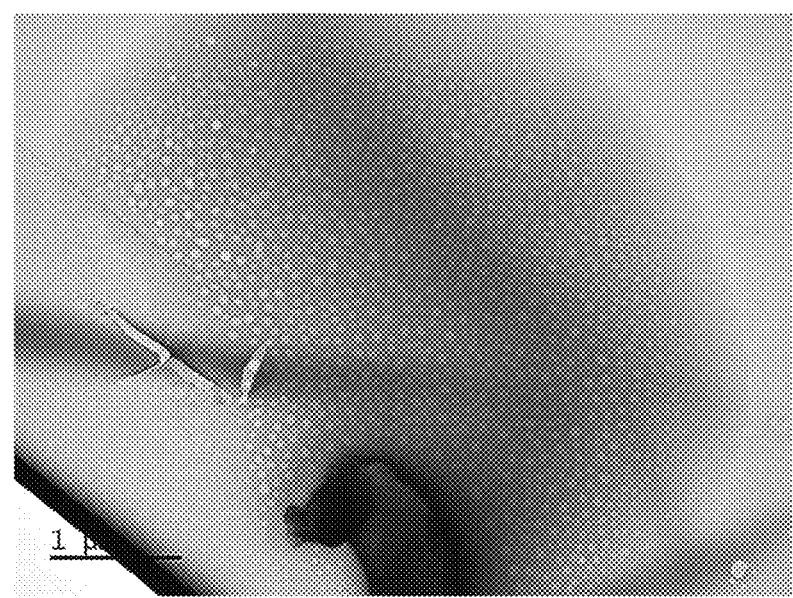
FIG. 30B shows a TEM image (uranyl acetate staining) of the nanoparticles of the PSar-b-PBLG copolymer in Example 14.

The NCA monomer of y-benzyl-L-glutamate (120 mg, 0.46 mmol) is placed in an inert atmosphere in a Schlenk tube containing a magnetic stir bar. The Schlenk is cooled in an ice bath for at least 10 minutes. In parallel, an aqueous 0.05 M solution of $NaHCO_3$ containing the macroinitiator (4 mL, 50 mg, 0.02 mmol) is prepared and left to cool in an ice bath for at least 10 minutes. While remaining in the ice bath, the aqueous solution is added to the NCA powder under vigorous stirring. This gives a milky dispersion resulting from non-miscibility of the monomer in the aqueous phase. The reaction is left under agitation 1) first in an iced water bath for about 2 hours, 2) then at ambient temperature for 16 hours. The milky dispersion changes to an aqueous opalescent colloidal solution which is transferred to a dialysis tube (dialysis membrane of 3.5 kDa) and dialysed against ultrapure water for 2 days. After lyophilization, a white powder is obtained with a yield of 55% (FIGS. 30A-30B).

Example 15: Concomitant Synthesis of an Amphiphilic Peptide Diblock Copolymer of poly(L-glutamic acid)-block-poly(y-benzyl-L-glutamate) and of their Corresponding Nanoparticles The y-Benzyl-L-glutamate N-carboxyanhydride monomer (BLG-NCA) is a commercial chemical reagent distributed by ISOCHEM. Poly(L-glutamic acid) PGA (Mw=6600 g/mol) is synthesized by conventional ring opening polymerization in the laboratory. The other reagents are distributed by Sigma-Aldrich.

Figure 31A:
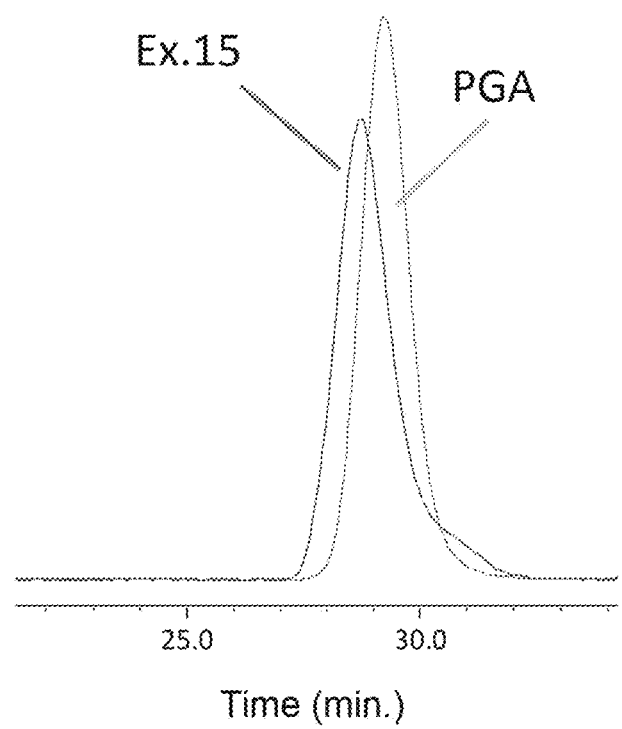
FIG. 31A shows size exclusion chromatography performed in $H_2O$ (Juanito buffer) of the PGA-b-PBLG copolymer in Example 15 after deprotection (RI detection)
Figure 31B:
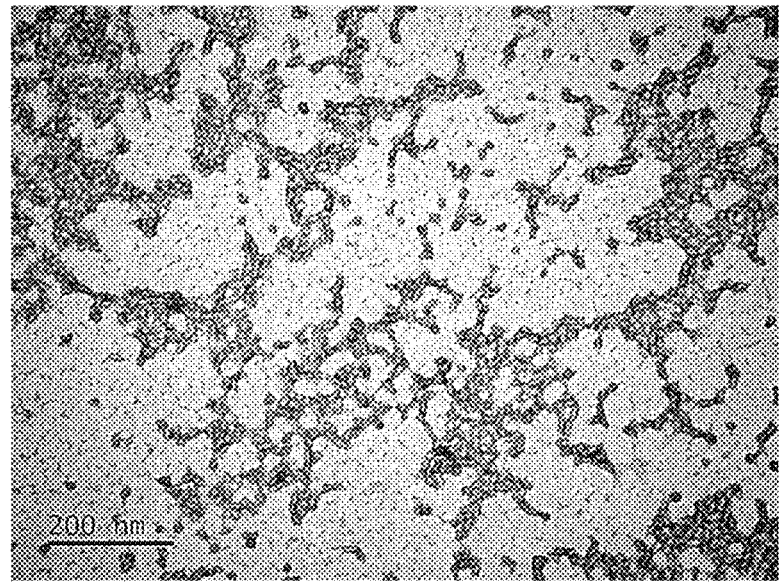
FIG. 31B shows a TEM image (uranyl acetate staining) of the nanoparticles of the PGA-b-PBLG copolymer in Example 15.

The NCA monomer of y-benzyl-L-glutamate (300 mg, 1.14 mmol) is placed in an inert atmosphere in a Schlenk tube containing a magnetic stir bar. The Schlenk is cooled in an ice bath for at least 10 minutes. In parallel, an aqueous 0.20 M solution of $NaHCO_3$ containing the macroinitiator (8 mL, 300 mg, 0.45 mmol) is prepared and left to cool in an ice bath for at least 10 minutes. While remaining in the ice bath, the aqueous solution is added to the NCA powder under vigorous stirring. This gives a milky dispersion resulting from non-miscibility of the monomer in the aqueous phase. The reaction is left under agitation 1) first in an iced water bath for about 2 hours, 2) then at ambient temperature for 16 hours. The milky dispersion changes to an aqueous opalescent colloidal solution which is transferred to a dialysis tube (dialysis membrane of 3.5 kDa) and dialysed against ultrapure water for 2 days (TEM image, FIGS. 31A-31B). After lyophilization, for analysis of the copolymer, the PBLG block is deprotected under mild acid conditions (MSA, TFA) to obtain a white powder that can be analysed in aqueous SEC (Juanito buffer) (FIGS. 31A-31B).

Example 16: Concomitant Synthesis of an Amphiphilic Peptide Diblock Copolymer polysaccharide-block-poly(y-benzyl-L-glutamate) and of their Corresponding Nanoparticles The y-Benzyl-L-glutamate N-carboxyanhydride monomer (BLG-NCA) is a commercial chemical reagent distributed by ISOCHEM. The polyaminosaccharide (Polysacc., Mw=7750 g/mol) is synthesized by anionic polymerization of β-lactam monomers in the laboratory. The other reagents are distributed by Sigma-Aldrich.

Figure 32A:
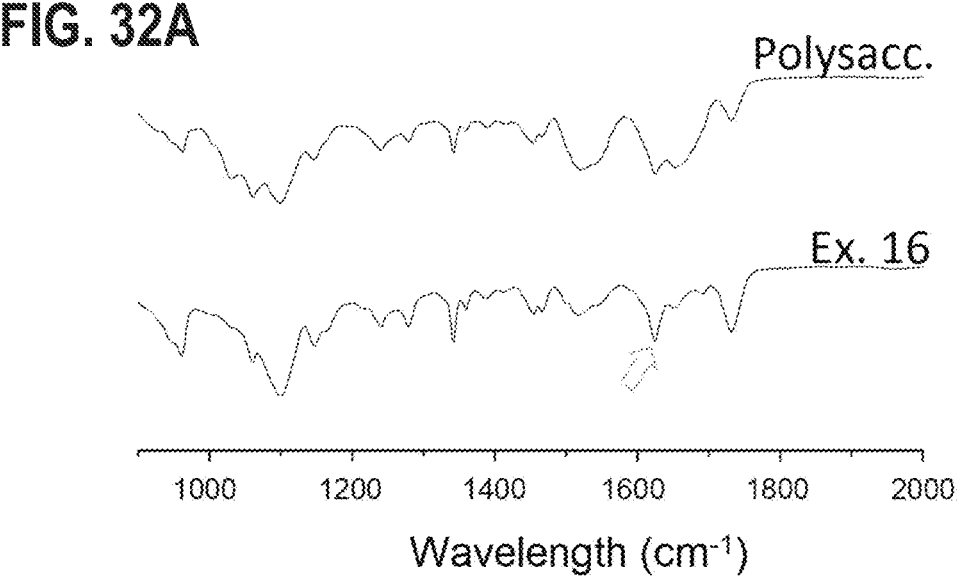
FIG. 32A shows infrared analysis of Example 16 (powder)
Figure 32B:
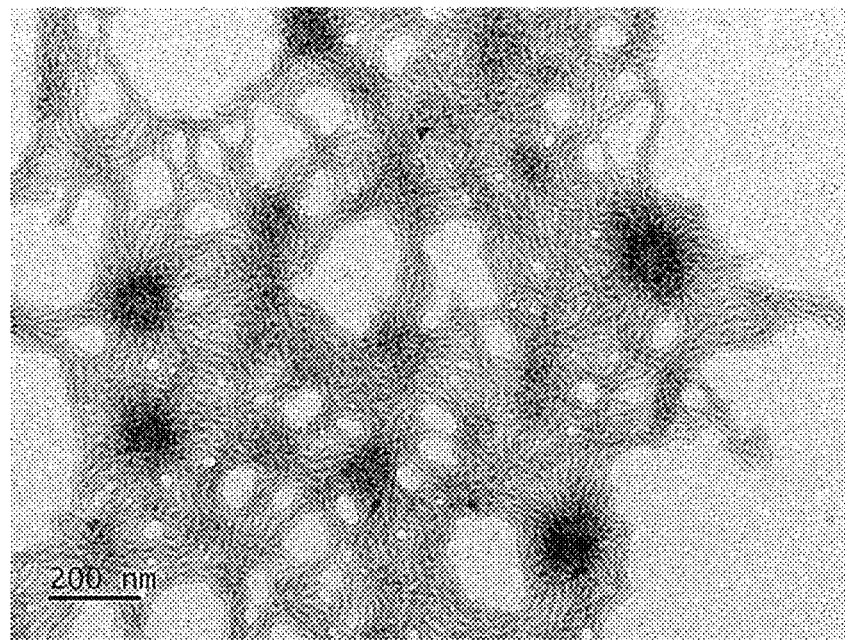
FIG. 32B shows a TEM image (uranyl acetate staining) of the nanoparticles of the copolymer in Example 16.

The NCA monomer of y-benzyl-L-glutamate (13 mg, 0.05 mmol) is placed in an inert atmosphere in a test tube containing a magnetic stir bar. The tube is cooled in an ice bath for at least 10 minutes. In parallel, an aqueous 0.05 M solution of $NaHCO_3$ containing the macroinitiator (2 mL, 20 mg, 0.003 mmol) is prepared and left to cool in an ice bath for at least 10 minutes. While remaining in the ice bath, the aqueous solution is added to the NCA powder under vigorous stirring. This gives a milky dispersion resulting from non-miscibility of the monomer in the aqueous phase. The reaction is left under agitation 1) first in an iced water bath for about 2 hours, 2) then at ambient temperature for 16 hours. The milky dispersion changes to an aqueous whitish colloidal solution which is transferred to a dialysis tube (dialysis membrane of 3.5 kDa) and dialysed against ultrapure water for 2 days. After lyophilization, a white powder is obtained (FIGS. 32A-32

Example 17: Concomitant Synthesis of an Amphiphilic Peptide Diblock Copolymer poly(ethylene glycol)$_{5k}$-block-poly(y-benzyl-L-glutamate) and of their Corresponding Nanoparticles on Very Small Scale The y-Benzyl-L-glutamate N-carboxyanhydride monomer (BLG-NCA) is a commercial chemical reagent distributed by ISOCHEM. $PEG_{5k}$-$NH_2$ (Mp=5516 Da, Đ=1.02) is distributed by RAPP Polymer. The other reagents are distributed by Sigma-Aldrich.

Figure 33:
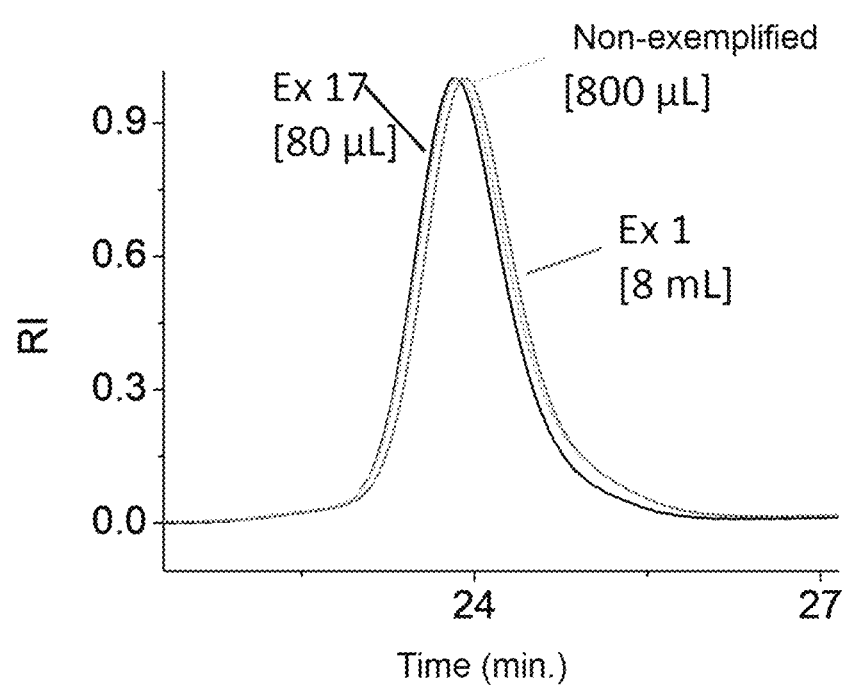
FIG. 33 shows size exclusion chromatography performed in DMF (+1 mg/mL LiBr) of the $PEG_{5k}$-b-PBLG copolymer in Example 17 (RI detection).

The NCA monomer of y-benzyl-L-glutamate (3 mg, 0.01 mmol) is placed in an inert atmosphere in a Eppendorf containing a small magnetic stir bar which is cooled in an ice bath for at least 10 minutes. In parallel, an aqueous 0.05 M solution of $NaHCO_3$ containing the macroinitiator $PEG_{5k}$-$NH_2$ (80 μL, 3 mg) is prepared and left to cool in an ice bath for at least 10 minutes. While remaining in the ice bath, the aqueous solution is added to the NCA powder under vigorous magnetic agitation. This gives a milky dispersion resulting from non-miscibility of the monomer in the aqueous phase. The reaction is left under agitation 1) first in an iced water bath for about 2 hours, 2) then at ambient temperature for 16 hours. The milky dispersion changes to an aqueous opalescent colloidal solution which is transferred to a dialysis tube (dialysis membrane of 3.5 kDa) and dialysed against ultrapure water for 2 days. After lyophilization, a white powder is obtained (FIG. 33).

Example 18: Concomitant Synthesis of an Amphiphilic Peptide Diblock Copolymer deoxyribonucleic acid-block-poly(y-benzyl-L-glutamate) and of their Corresponding Nanoparticles on Very Small Scale The y-Benzyl-L-glutamate N-carboxyanhydride monomer (BLG-NCA) is a commercial chemical reagent distributed by ISOCHEM. Deoxyribonucleic acid DNA (TTT)15 (Mw=4680 g/mol) is distributed by IDT Technologies. The other reagents are distributed by Sigma-Aldrich.

Figure 34A:
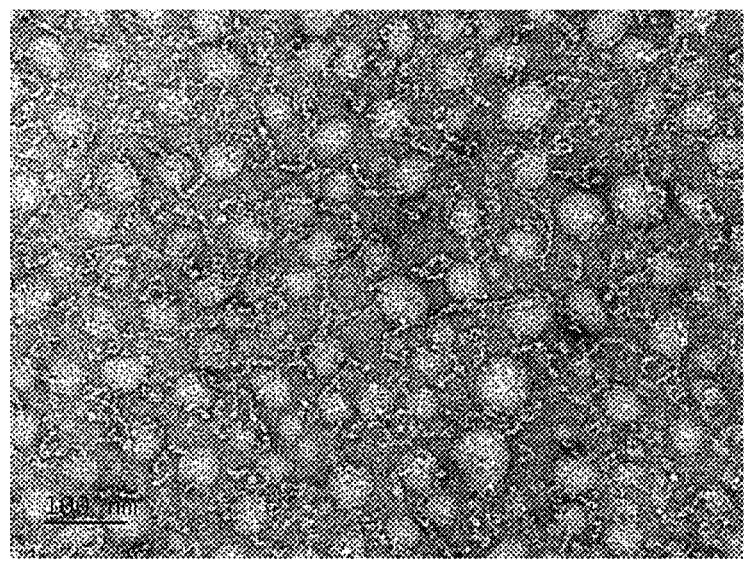
FIG. 34A shows a TEM image (uranyl acetate staining) of the nanoparticles of the copolymer in Example 18.
Figure 34B:
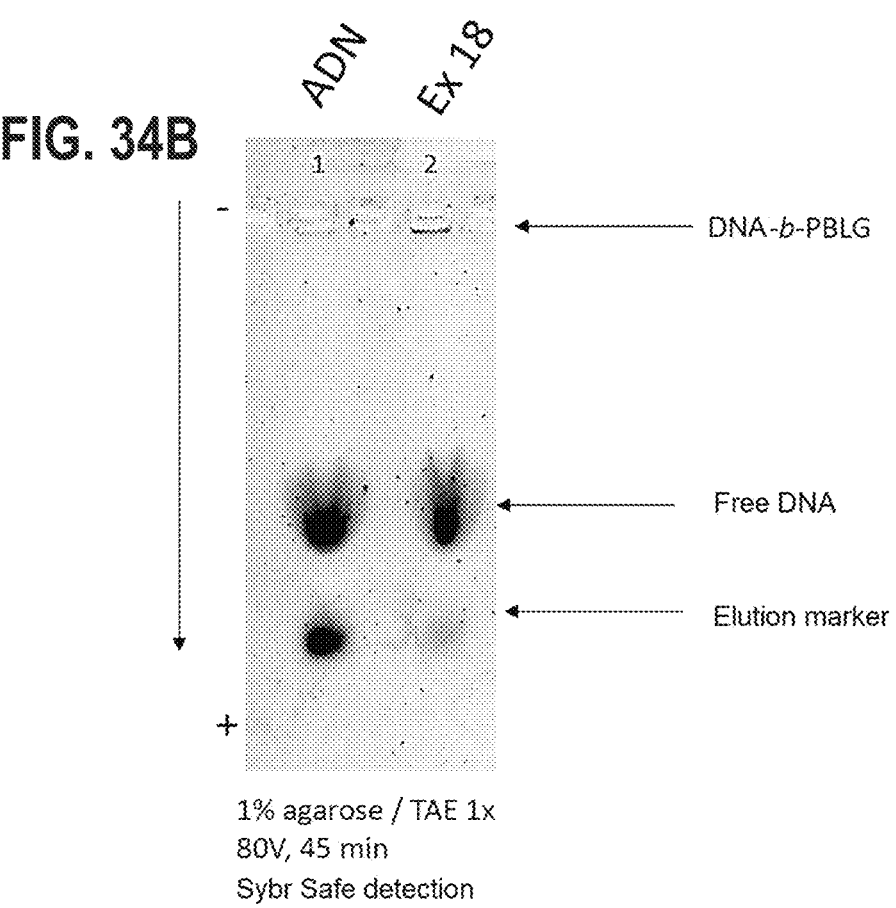
FIG. 34B shows the distribution (in diffusion intensity) of the hydrodynamic diameter (Dh) of the nanoparticles in Example 18 (in ultrapure water)
Figure 34C:
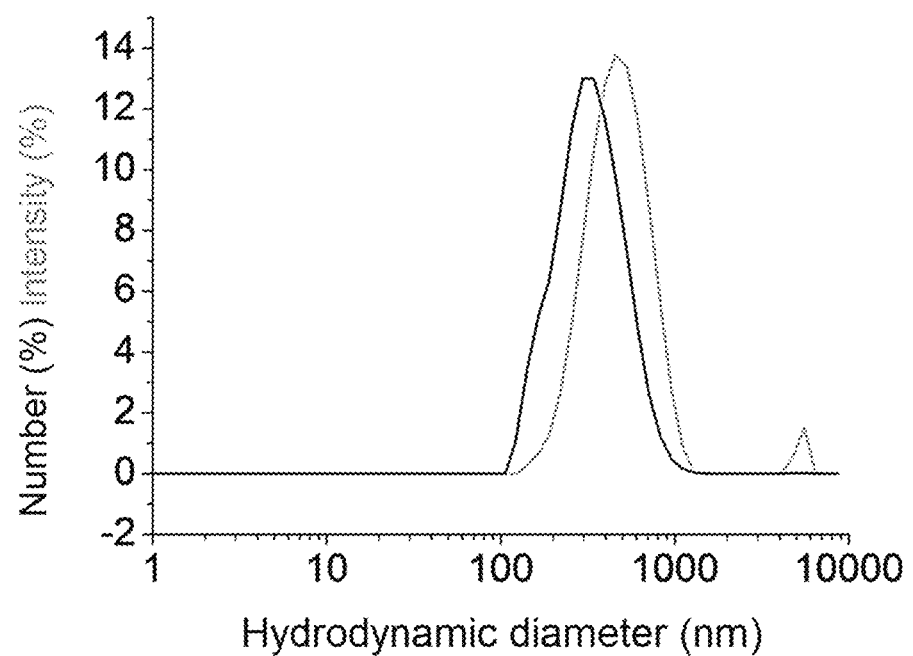
FIG. 34C shows electrophoresis gel showing the formation of the copolymer in Example 18.

The NCA monomer of y-benzyl-L-glutamate (5 mg) is placed in an inert atmosphere in an Eppendorf which is cooled in an ice bath for at least 10 minutes. In parallel, an aqueous 0.05 M solution of $NaHCO_3$ containing the DNA macroinitiator (1 mL, 5 mg) is prepared and left to cool in an ice bath for at least 10 minutes. While remaining in the ice bath, the aqueous solution is added to the NCA powder under vigorous magnetic agitation. This gives a milky dispersion resulting from non-miscibility of the monomer in the aqueous phase. The reaction is left under agitation 1) first in an iced water bath for about 2 hours, 2) then at ambient temperature for 16 hours. The milky dispersion changes to an aqueous opalescent colloidal solution which is transferred to a dialysis tube (dialysis membrane of 3.5 kDa) and dialysed against ultrapure water for 2 days. After lyophilization, a white powder is obtained (FIGS. 34A-34C).

Tables 1 and 2 below give the molecular and physicochemical characteristics of the copolymers synthesized by ROPISA, and of their nanoparticles, according to the above examples.

TABLE 1

| Copolymer | Buffer | Initiator | M/I g/mol Th. | Ts (%) | M/I $^1$H NMR | Mn g/mol $^1$H NMR | Mn g/mol SEC* | Đ |
|---|---|---|---|---|---|---|---|---|
| PEG$_{5k}$-NH$_2$ | — | — | — | — | — | — | 6996 | 1.02 |
| Ex. 1 | NaHCO$_3$ 50 mM | PEG$_{5k}$-NH$_2$ | 19 | 7 | 20 | 9380 | 11940 | 1.05 |
| Ex. 2 | MQ | PEG$_{5k}$-NH$_2$ | 19 | 7 | 20 | 9380 | 13470 | 1.14 |
| Ex. 3 | NaHCO$_3$ 50 mM | PEG$_{5k}$-NH$_2$ | 19 | 13 | 21 | 9600 | 12250 | 1.06 |
| Ex. 4 | NaHCO$_3$ 50 mM | PEG$_{5k}$-NH$_2$ | 38 | 10 | 35 | 12670 | 14370 | 1.09 |
| Ex. 5 | NaHCO$_3$ 200 mM | PEG$_{2k}$-NH$_2$ | 8 | 13 | — | — | 4067 | 1.20 |
| Ex. 6 | NaHCO$_3$ 50 mM | PEG$_{10k}$-NH$_2$ | 38 | 7 | 37 | 18100 | 24660 | 1.12 |
| Ex. 7 | NaHCO$_3$ 50 mM | ELPM40 | 65 | 0.7 | 30 | 23600 | 27000 | 1.03 |
| Ex. 8 | NaHCO$_3$ 50 mM | PEG$_{5k}$-NH$_2$ | 19 | 7 | 21 | 9790 | 11750 | 1.09 |
| Ex. 9 | NaHCO$_3$ 200 mM | PEG$_{5k}$-NH$_2$ | 38 | 13 | — | — | 12220 | 1.05 |
| Ex. 10 | NaHCO$_3$ 50 mM | PEG$_{5k}$-NH$_2$ | 32 | 7 | — | — | 10600 | 1.04 |
| Ex. 11 | NaHCO$_3$ 50 mM | PEG$_{5k}$-NH$_2$ 2arms- | 13 | 5 | — | — | — | — |
| Ex. 12 | NaHCO$_3$ 50 mM | PEG$_{5k}$-NH$_2$ 4arms- | 19 | 8 | 18 | 9900 | 14700 | 1.10 |
| Ex. 13 | NaHCO$_3$ 50 mM | PEG$_{5k}$-NH$_2$ | 10 | 8 | 16 | 8500 | 11700 | 1.32 |
| Ex. 14 | NaHCO$_3$ 50 mM | PSar | 19 | 7 | — | — | 7100 | 1.34 |
| Ex. 15 | NaHCO$_3$ 50 mM | PGA | — | — | — | — | — | — |
| Ex. 16 | NaHCO$_3$ 50 mM | Polysacc. | 19 | 1.6 | — | — | — | — |
| Ex. 17 | NaHCO$_3$ 50 mM | PEG$_{5k}$-NH$_2$ | 9 | 7 | 20 | 9380 | 11900 | 1.05 |
| Ex. 18 | PEG$_{5k}$-NH$_2$ | DNA | 19 | 5 | — | — | — | — |

*Number average molecular weight (M$_n$) and dispersity (Đ) determined by SEC in DMF (+LiBr) using a polystyrene calibration curve.

TABLE 2

| Copolymer | Buffer | Initiator | D$_h$ (σ) nm DLS | Yield % |
|---|---|---|---|---|
| PEG$_{5k}$-NH$_2$ | — | — | — | — |
| Ex. 1 | NaHCO$_3$ 50 mM | PEG$_{5k}$-NH$_2$ | 79 (0.08) | 87 |
| Ex. 2 | MQ | PEG$_{5k}$-NH$_2$ | — | — |
| Ex. 3 | NaHCO$_3$ 50 mM | PEG$_{5k}$-NH$_2$ | 88 (0.17) | 77 |
| Ex. 4 | NaHCO$_3$ 50 mM | PEG$_{5k}$-NH$_2$ | 99 (0.12) | 85 |
| Ex. 5 | NaHCO$_3$ 200 mM | PEG$_{2k}$-NH$_2$ | polydisperse | — |
| Ex. 6 | NaHCO$_3$ 50 mM | PEG$_{10k}$-NH$_2$ | gel | 83 |
| Ex. 7 | NaHCO$_3$ 200 mM | ELPM40 | Aggregated at T$_a$ | — |
| Ex. 8 | NaHCO$_3$ 50 mM | PEG$_{5k}$-NH$_2$ | 131 (0.19) | 79 |
| Ex. 9 | NaHCO$_3$ 200 mM | PEG$_{5k}$-NH$_2$ | — | 75 |
| Ex. 10 | NaHCO$_3$ 50 mM | PEG$_{5k}$-NH$_2$ | 92 (0.22) | 77 |
| Ex. 11 | NaHCO$_3$ 50 mM | PEG$_{5k}$-NH$_2$ 2arms- | 125 (0.33) | 72 |
| Ex. 12 | NaHCO$_3$ 50 mM | PEG$_{5k}$-NH$_2$ 4arms- | — | — |
| Ex. 13 | NaHCO$_3$ 50 mM | PEG$_{5k}$-NH$_2$ | — | — |
| Ex. 14 | NaHCO$_3$ 50 mM | PSar | — | 55 |
| Ex. 15 | NaHCO$_3$ 50 mM | PGA | 99 (0.7) | — |
| Ex. 16 | NaHCO$_3$ 50 mM | Polysacc. | 414 (0.19) | — |
| Ex. 17 | NaHCO$_3$ 50 mM | PEG$_{5k}$-NH$_2$ | — | — |
| Ex. 18 | NaHCO$_3$ 50 mM | DNA | 460 (0.26) | — |

The invention claimed is:

1. A one pot method for preparing an aqueous solution of nanoparticles of amphiphilic block copolymers and comprising polypeptide units, said method comprising at least one step (E1) in an aqueous solvent free of organic solvent, consisting of bringing together:
    at least one hydrophilic polymer (P1) comprising at least one amine function, and
    at least one hydrophobic α-amino acid N-carboxyanhydride monomer,
    wherein the polymer (P1) is chosen from polymers having the following formula:

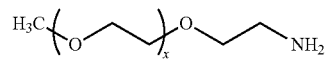

where x is from 16 to 500, and
elastin-like polypeptides (ELPs) comprising at least one amine function.

2. The method according to claim 1 wherein the hydrophobic α-amino acid N-carboxyanhydride monomer has the following formula (I):

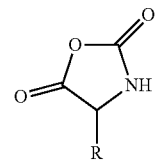

where R is the side chain of an optionally protected, natural or modified, hydrophobic α-amino acid.

3. The method according to claim 1, wherein the aqueous solvent is water or a buffer.

4. The method according to claim 1, wherein the aqueous solvent also comprises a buffer solution comprising an inorganic salt at concentrations ranging from 0.01 M to 1 M.

5. The method according to claim 1, wherein the pH of the aqueous solvent is from 2 to 12.

6. The method according to claim 1, wherein the temperature at step (E1) is from −10° C. to 80° C.

7. The method according to claim 1, wherein step (E1) is conducted under agitation from a dispersion of the hydrophobic α-amino acid N-carboxyanhydride monomer.

8. The method according to claim 1, wherein the aqueous solution of nanoparticles of amphiphilic block copolymers obtained after step (E1) is subsequently contacted with a second hydrophobic α-amino acid N-carboxyanhydride monomer, the same or differing from the one at step (E1), which allows an aqueous solution to be obtained of modified nanoparticles of modified amphiphilic block copolymers.

9. The method of claim 4, wherein the aqueous solvent also comprises a buffer solution is selected from the group consisting of sodium hydrogen carbonate solutions and phosphate buffer solutions.

\* \* \* \* \*